United States Patent
Chung et al.

(10) Patent No.: US 12,230,185 B2
(45) Date of Patent: Feb. 18, 2025

(54) DISPLAY APPARATUS AND DRIVING METHOD THEREOF

(71) Applicant: SAMSUNG ELECTRONICS CO., LTD., Suwon-si (KR)

(72) Inventors: Jinjoo Chung, Suwon-si (KR); Daesung Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 161 days.

(21) Appl. No.: 18/123,756

(22) Filed: Mar. 20, 2023

(65) Prior Publication Data

US 2023/0230527 A1    Jul. 20, 2023

Related U.S. Application Data

(63) Continuation of application No. PCT/KR2021/013613, filed on Oct. 5, 2021.

(30) Foreign Application Priority Data

Dec. 1, 2020   (KR) .......................  10-2020-0165719

(51) Int. Cl.
  *G09G 3/20*      (2006.01)
  *G09G 3/34*      (2006.01)
  *G09G 3/36*      (2006.01)

(52) U.S. Cl.
  CPC ........... *G09G 3/2096* (2013.01); *G09G 3/342* (2013.01); *G09G 3/36* (2013.01); *G09G 2320/02* (2013.01);
  (Continued)

(58) Field of Classification Search
  None
  See application file for complete search history.

(56) References Cited

U.S. PATENT DOCUMENTS

| 7,532,195 B2 | 5/2009 | Sampsell |
| 8,242,982 B2 | 8/2012 | Kang et al. |

(Continued)

FOREIGN PATENT DOCUMENTS

| JP | 2011-191441 A | 9/2011 |
| JP | 5227884 B2 | 7/2013 |

(Continued)

OTHER PUBLICATIONS

International Search Report dated Jan. 18, 2022, issued by the International Searching Authority in International Application No. PCT/KR2021/013613 (PCT/ISA/210).

(Continued)

*Primary Examiner* — Krishna P Neupane
(74) *Attorney, Agent, or Firm* — Sughrue Mion, PLLC

(57) ABSTRACT

A display apparatus includes: a display panel; a backlight unit including a plurality of backlight blocks; and a processor configured to drive the backlight unit to output light, wherein the processor may be further configured to: adjust a first image having a first resolution to a second image having a second resolution that is smaller than the first resolution, divide an image area corresponding to a first backlight block among the plurality of backlight blocks in the second image having the second resolution into a plurality of image areas, acquire current information corresponding to the first backlight block and a second backlight block adjacent to the first backlight block, based on the plurality of image areas, and drive the backlight unit based on the acquired current information.

20 Claims, 20 Drawing Sheets

(52) U.S. Cl.
CPC ............... *G09G 2320/0626* (2013.01); *G09G 2340/0414* (2013.01); *G09G 2340/0421* (2013.01); *G09G 2340/0435* (2013.01); *G09G 2354/00* (2013.01)

(56) References Cited

U.S. PATENT DOCUMENTS

| | | | |
|---|---|---|---|
| 8,243,014 B2 | 8/2012 | Sampsell | |
| 8,373,645 B2 | 2/2013 | Song et al. | |
| 8,471,808 B2 | 6/2013 | Sampsell | |
| 8,564,528 B1 * | 10/2013 | Chen ................... | G09G 3/3611 345/102 |
| 8,670,006 B2 | 3/2014 | Hong et al. | |
| 8,878,771 B2 | 11/2014 | Sampsell | |
| 8,970,638 B2 | 3/2015 | Kimura | |
| 9,047,829 B2 | 6/2015 | Tanaka et al. | |
| 9,583,060 B2 | 2/2017 | Kimura | |
| 10,943,549 B2 | 3/2021 | Kimura | |
| 2006/0066597 A1 | 3/2006 | Sampsell | |
| 2009/0219309 A1 | 9/2009 | Sampsell | |
| 2009/0225069 A1 | 9/2009 | Sampsell | |
| 2009/0295309 A1 | 12/2009 | Kang et al. | |
| 2010/0007670 A1 | 1/2010 | Song et al. | |
| 2010/0201719 A1 | 8/2010 | Kimura | |
| 2010/0295879 A1 | 11/2010 | Tanaka et al. | |
| 2011/0102422 A1 | 5/2011 | Park et al. | |
| 2011/0141090 A1 | 6/2011 | Hong et al. | |
| 2012/0320108 A1 | 12/2012 | Sampsell | |
| 2015/0084998 A1 | 3/2015 | Sampsell | |
| 2015/0179118 A1 | 6/2015 | Kimura | |
| 2017/0162131 A1 | 6/2017 | Kimura | |
| 2018/0122307 A1 | 5/2018 | Li et al. | |
| 2018/0182306 A1 * | 6/2018 | Seong ................... | G09G 3/36 |
| 2019/0043413 A1 * | 2/2019 | Kim ..................... | G09G 3/2092 |
| 2021/0035506 A1 * | 2/2021 | Cong ................... | G09G 3/342 |
| 2021/0193059 A1 | 6/2021 | Kimura | |

FOREIGN PATENT DOCUMENTS

| | | |
|---|---|---|
| KR | 10-2010-0006954 A | 1/2010 |
| KR | 10-1067631 B1 | 9/2011 |
| KR | 10-2012-0094880 A | 8/2012 |
| KR | 10-1351414 B1 | 1/2014 |
| KR | 10-1471157 B1 | 12/2014 |
| KR | 10-2016-0076614 A | 7/2016 |
| KR | 10-1659575 B1 | 9/2016 |
| KR | 10-2019-0048510 A | 5/2019 |
| KR | 10-2104986 B1 | 4/2020 |
| KR | 10-2020-0078241 A | 7/2020 |
| WO | 2014/165251 A2 | 10/2014 |

OTHER PUBLICATIONS

Written Opinion dated Jan. 18, 2022, issued by the International Searching Authority in International Application No. PCT/KR2021/013613 (PCT/ISA/237).

* cited by examiner

This application is a by-pass continuation application of International Application No. PCT/KR2021/013613, filed on Oct. 5, 2021, which is based on and claims priority to Korean Patent Application No. 10-2020-0165719, filed on Dec. 1, 2020, in the Korean Intellectual Property Office, the disclosures of which are incorporated by reference herein their entireties.

BACKGROUND

1. Field

The disclosure relates to a display apparatus and a driving method thereof, and more particularly, to a display apparatus including a backlight, and a driving method thereof.

2. Description of the Related Art

A display apparatus implemented as a panel that cannot emit light by itself, such as a liquid crystal display panel, includes a backlight unit. For example, if light is emitted from a light source such as a white light-emitting diode included in a backlight unit, the brightness of the light can be controlled by a liquid crystal for each pixel.

In a dark image, a lot of light is blocked by the liquid crystal and only a little amount of light is made to pass through, and thus, dark luminance is created. In a bright image, most light is made to pass through, and thus, bright luminance is created. The luminance is adjusted according to how much of the light amount is blocked by a liquid crystal.

However, the liquid crystal cannot block all the light, and in particular, there is a limitation on blocking light with a liquid crystal in a dark image such as a black image. A light leakage phenomenon, which is the limitation of a liquid crystal display apparatus as above, becomes a factor for degradation of a contrast ratio.

Recently, a local dimming technology is being used for resolving the aforementioned problem. Local dimming is a technology of dividing a backlight unit into a plurality of physical backlight blocks, and driving each physical backlight block independently. For example, by the local dimming technology, a backlight unit is driven by decreasing the light amount of a backlight block matched to a dark part of an image, and increasing the light amount of a backlight block matched to a bright part of the image.

In case a display apparatus reduces the resolution of an input image and outputs the image of which resolution was reduced at a high speed frame rate, if the backlight is driven by the same method as the conventional method, there is a problem that the brightness of the output image is darker compared to the brightness of the input image, or is distorted.

SUMMARY

Provided are a display apparatus that may not make the brightness of the backlight distorted in the case of outputting an image of which resolution is reduced at a high speed frame rate, and a driving method thereof.

According to an aspect of the disclosure, a display apparatus includes: a display panel; a backlight unit including a plurality of backlight blocks; and a processor configured to drive the backlight unit to output light, wherein the processor may be further configured to: adjust a first image having a first resolution to a second image having a second resolution that is smaller than the first resolution, divide an image area corresponding to a first backlight block among the plurality of backlight blocks in the second image having the second resolution into a plurality of image areas, acquire current information corresponding to the first backlight block and a second backlight block adjacent to the first backlight block, based on the plurality of image areas, and drive the backlight unit based on the acquired current information.

A horizontal resolution of the second image having the second resolution may be the same as a horizontal resolution of the first image having the first resolution, and a vertical resolution of the second image having the second resolution may correspond to an N equal division value of a vertical resolution of the first image having the first resolution, wherein N is a natural number that is equal to or greater than one, and the processor may be further configured to: divide the image area corresponding to the first backlight block in the second image having the second resolution into N image areas, wherein N is a natural number that is greater than one, based on the divided N image areas, acquire current information corresponding to the first backlight block and N−1 backlight blocks adjacent to the first backlight block in a vertical direction, and drive the backlight unit based on the acquired current information.

The processor may be further configured to: acquire a current dimming value for driving the backlight unit based on the current information, determine a frame rate of the second image with the second resolution based on the first resolution and the second resolution, and adjust an output interval of the current dimming value based on the frame rate of the second image with the second resolution.

A horizontal resolution of the second resolution may be the same as a horizontal resolution of the first resolution, a vertical resolution of the second resolution may correspond to an N equal division value of a vertical resolution of the first resolution, wherein N is a natural number that is equal to or greater than one, and the frame rate of the second image having the second resolution may be N times of a frame rate corresponding to the first image having the first resolution.

The display apparatus may further include: a panel driver configured to drive the display panel; and a backlight driver configured to drive the backlight unit, and the processor may be further configured to: output a vertical synchronization signal to the panel driver based on the frame rate of the second image having the second resolution, and output a dimming control value for adjusting the output interval of the current dimming value based on the frame rate of the second image having the second resolution to the backlight driver.

The display apparatus may further include a plurality of pixel lines, wherein the processor may be further configured to: provide a same data to at least two adjacent pixel lines among the plurality of pixel lines, and control the display panel to output the second image having the second resolution at the determined frame rate.

A number of the plurality of pixel lines may correspond to a number of pixels provided in a vertical direction among a plurality of pixels in the display panel.

The processor may be further configured to: based on the display apparatus operating in a first display mode, control the display panel to output the first image having the first resolution at a first frame rate, and drive the backlight unit based on current information acquired based on the first frame rate and the first image having the first resolution, and based on the display apparatus operating in a second display mode, control the display panel to output the second image having the second resolution at a second frame rate that is greater than the first frame rate, and drive the backlight unit based on current information acquired based on the second frame rate and the second image with the second resolution.

The processor may be further configured to operate the display apparatus in one of the first display mode or the second display mode based on a user input or a type of an image.

The display panel may be a liquid crystal panel, and the processor may be further configured to drive the plurality of backlight blocks by a local dimming method or a global dimming method.

According to an aspect of the disclosure, a method performed by a display apparatus including a display panel and a backlight unit including a plurality of backlight blocks, includes: adjusting a first image having a first resolution to a second image having a second resolution that is smaller than the first resolution; dividing an image area corresponding to a first backlight block among the plurality of backlight blocks in the second image having the second resolution into a plurality of image areas; acquiring current information corresponding to the first backlight block and a second backlight block adjacent to the first backlight block, based on the plurality of image areas; and driving the backlight unit based on the acquired current information.

A horizontal resolution of the second image having the second resolution may be the same as a horizontal resolution of the first image having the first resolution, a vertical resolution of the second image having the second resolution may correspond to an N equal division value of a vertical resolution of the first image having the first resolution, wherein N is a natural number that is equal to or greater than one, and the dividing the image area may include dividing the image area corresponding to the first backlight block in the second image having the second resolution into N image areas, and the acquiring the current information may further include, based on the divided N image areas, acquiring current information corresponding to the first backlight block and N−1 backlight blocks adjacent to the first backlight block in a vertical direction.

The method may further include: determining a frame rate of the second image having the second resolution based on the first resolution and the second resolution; and adjusting an output interval of a current dimming value for driving the backlight unit based on the frame rate of the second image having the second resolution.

A horizontal resolution of the second resolution may be the same as a horizontal resolution of the first resolution, a vertical resolution of the second resolution may correspond to an N equal division value of a vertical resolution of the first resolution, wherein N is a natural number that is equal to or greater than one, and the frame rate of the second image having the second resolution may be N times of a frame rate corresponding to the first image having the first resolution.

The determining the frame rate of the second image having the second resolution may include outputting a vertical synchronization signal to a panel driver configured to drive the display panel based on the frame rate of the second image having the second resolution, and the adjusting the output interval of the current dimming value may include outputting a dimming control value for adjusting the output interval of the current dimming value based on the frame rate of the second image having the second resolution to a backlight driver configured to drive the backlight unit.

According to one or more embodiments of the disclosure, in the case of outputting an image of which resolution is reduced at a high speed frame rate, the brightness of the backlight may be prevented from being distorted. Also, backlight dimming may be controlled to be appropriate for each of a plurality of display modes. Accordingly, an image with improved image quality may be provided to a user.

According to an aspect of the disclosure, a non-transitory computer readable recording medium storing computer instructions that cause a display apparatus to perform an operation when executed by a processor of the electronic apparatus, the display apparatus comprising a display panel and a backlight unit comprising a plurality of backlight blocks, wherein the operation comprises; adjusting a first image having a first resolution to a second image having a second resolution that is smaller than the first resolution; dividing an image area corresponding to a first backlight block among the plurality of backlight blocks in the second image having the second resolution into a plurality of image areas; acquiring current information corresponding to the first backlight block and a second backlight block adjacent to the first backlight block, based on the plurality of image areas; and driving the backlight unit based on the acquired current information.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
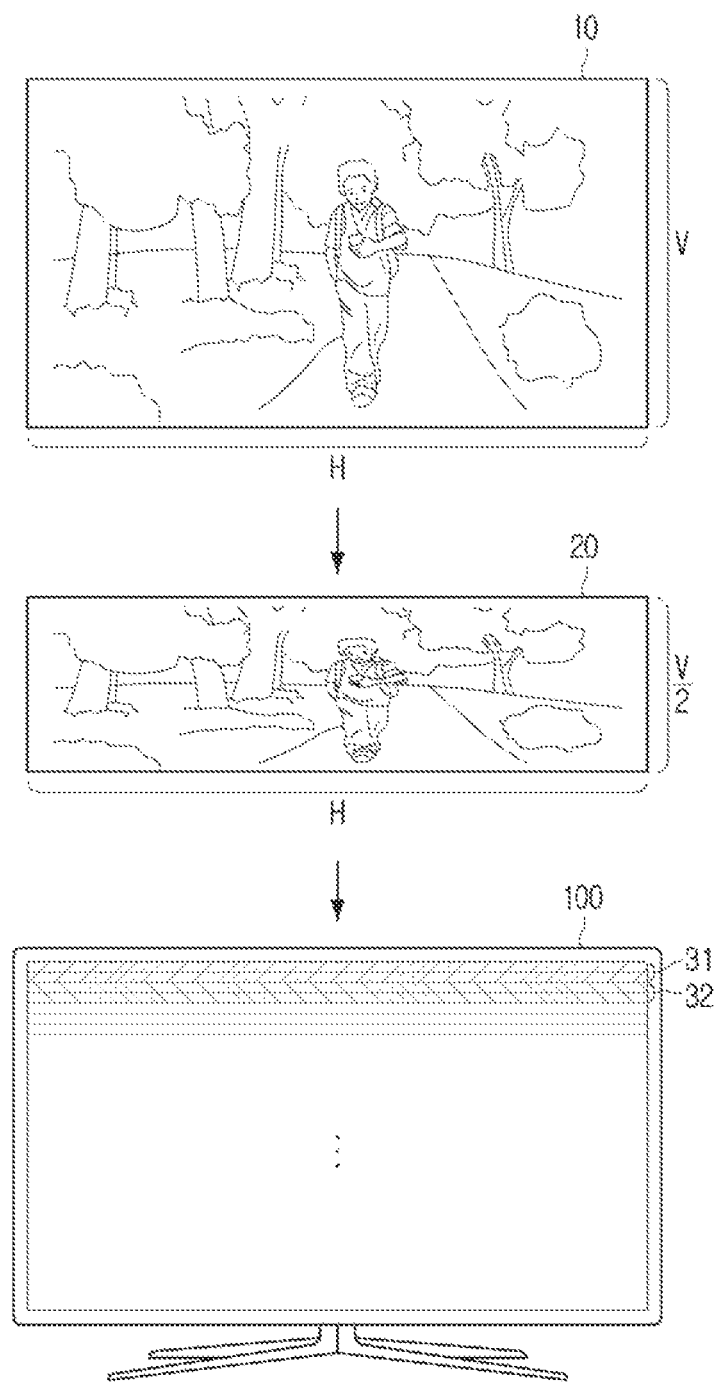
FIG. 1 is a diagram for illustrating a characteristic of a display panel according to an embodiment of the disclosure.

Hereinafter, embodiments of the disclosure will be described in detail with reference to the accompanying drawings.

First, terms used in this specification will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies, etc. Also, in particular cases, there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g.: elements such as numbers, functions, operations, and components), and do not exclude the existence of additional characteristics.

In addition, the expression "at least one of A and/or B" should be interpreted to mean any one of "A" or "B" or "A and B."

Further, the expressions "first," "second," and the like used in this specification may be used to describe various elements regardless of any order and/or degree of importance. Also, such expressions are used only to distinguish one element from another element, and are not intended to limit the elements.

In addition, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

Also, singular expressions include plural expressions as long as they do not obviously mean differently in the context. In addition, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In addition, in the disclosure, "a module" or "a part" performs at least one function or operation, and may be implemented as hardware or software, or as a combination of hardware and software. Also, a plurality of "modules" or a plurality of "parts" may be integrated into at least one module and implemented as at least one processor, except "a module" or "a part" that needs to be implemented as specific hardware.

Hereinafter, an embodiment of the disclosure will be described in more detail with reference to the accompanying drawings.

FIG. 1 is a diagram for illustrating a display apparatus according to an embodiment of the disclosure.

According to an embodiment, the display apparatus 100 may include a display panel that outputs an input image at a low speed frame rate (e.g., 60 Hz). In this case, if an image of 120 Hz such as a high frame rate (HFR) or a variable refresh rate (VRR) is input or an image of a quick motion is input, the display apparatus 100 may reduce the resolution of the input image, and output the image of which resolution was reduced at a high speed frame rate. Here, the frame rate may mean the time and the speed of the display apparatus 100 of displaying one frame. As an example, if the frame rate of the display apparatus 100 is 60 Hz, the display apparatus 100 may display one frame by scanning the entire display area for $\frac{1}{60}$s. The frame rate may also be referred to as a screen refresh rate, a driving frequency, or a refresh rate, but it will be generally referred to as a frame rate below, for the convenience of explanation.

For example, the display apparatus 100 may reduce the resolution in a vertical direction v of an input image 10 to ½, and output an image 20 of which resolution was reduced at a frame rate of 120 Hz. In this case, the display apparatus 100 may drive a plurality of gate lines simultaneously, and display a plurality of vertical pixel lines, e.g., two pixel lines 31 simultaneously, and may continuously display the next two pixel lines 32 simultaneously. Accordingly, dragging of an image can be improved, and an image with good quality can be provided to a user. That is, in the case of a display panel supporting only 60 Hz, it cannot output an image having a frame rate exceeding 60 Hz, but by reducing the resolution in a vertical direction, an image having a frame rate exceeding 60 Hz can also be output. As described above, a method of displaying an image by driving two gate lines simultaneously may also be referred to as dual line gating (referred to as DLG hereinafter).

In case the display apparatus 100 includes a display panel that cannot emit light by itself such as a liquid crystal display apparatus, the display apparatus 100 may include a backlight unit that outputs light. Hereinafter, one or more embodiments for driving a backlight unit in case an image of which resolution was adjusted is output at a high speed frame rate as described above will be described.

Figure 2:
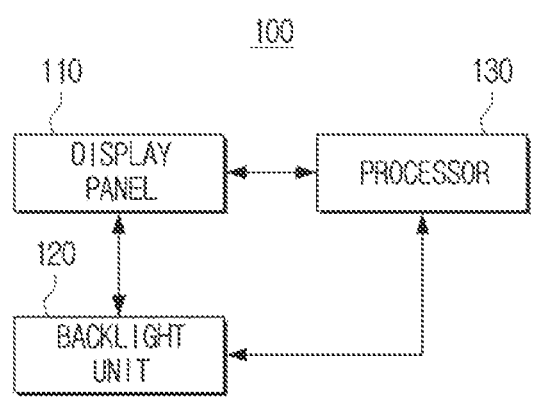
FIG. 2 is a block diagram illustrating a configuration of a display apparatus according to an embodiment of the disclosure.

FIG. 2 is a block diagram illustrating a configuration of a display apparatus according to an embodiment of the disclosure.

According to FIG. 2, the display apparatus 100 includes a display panel 110, a backlight unit 120, and a processor 130.

The display apparatus 100 may be implemented as a smart TV, an Internet TV, a web TV, an Internet protocol television (IPTV), signage, a PC, a smart TV, a monitor, a smartphone, a Tablet etc., but is not limited thereto, and it may be implemented as apparatuses in various types equipped with a display function such as a large format display (LFD), digital signage, a digital information display (DID), a video wall, a projector display, etc.

The display panel 110 includes a plurality of pixels, and each pixel may consist of a plurality of sub-pixels. For example, each pixel may consist of three sub-pixels corresponding to a plurality of lights, e.g., lights of red, green, and blue colors R, G, B. However, the disclosure is not limited thereto, and depending on cases, sub-pixels of cyan, magenta, yellow, black, or other colors may also be included other than sub-pixels of red, green, and blue colors. Here, the display panel 110 may be implemented as a panel including non-self-emission elements, e.g., a liquid crystal panel. However, it is also possible that the display panel 110 is implemented as a display panel in a different form, if backlight dimming according to an embodiment of the disclosure can be applied.

The backlight unit 120 radiates light on the display panel 110.

In particular, the backlight unit 120 radiates light to the direction of the display panel 110 on the rear surface of the display panel 110, i.e., the opposite surface of the surface on which an image is displayed.

The backlight unit 120 includes a plurality of light sources, and the plurality of light sources may include a line light source such as a lamp or a point light source such as a light-emitting diode (LED), but are not limited thereto. The backlight unit 120 may be implemented as a direct type backlight unit or an edge type backlight unit. The light sources of the backlight unit 120 may include any one or two or more types of light sources among an LED, a hot cathode fluorescent lamp (HCFL), a cold cathode fluorescent lamp (CCFL), an external electrode fluorescent lamp (EEFL), an electro-luminescent panel (ELP), and a flat fluorescent lamp (FFL).

According to an embodiment, the backlight unit 120 may be implemented as a plurality of LED modules and/or a plurality of LED cabinets. Also, the LED modules may include a plurality of LED pixels, and according to an embodiment, an LED pixel may be implemented as a blue LED or a white LED, but is not limited thereto, and an LED pixel may be implemented in a form of including at least one of a red LED, a green LED, or a blue LED.

The processor 130 controls the overall operations of the display apparatus 100.

According to an embodiment, the processor 130 may be implemented as a digital signal processor (DSP), a microprocessor, and a time controller (TCON). However, the disclosure is not limited thereto, and the processor 130 may include one or more of a central processing unit (CPU), a micro controller unit (MCU), a micro processing unit (MPU), a controller, an application processor (AP), a graphics-processing unit (GPU) or a communication processor (CP), and an ARM processor, or may be defined by the terms. Also, the processor 130 may be implemented as a system on chip (SoC) having a processing operation stored therein or large scale integration (LSI), or in the form of a field programmable gate array (FPGA). The processor 130 may perform various functions by executing computer executable instructions stored in advance.

The processor 130 drives the backlight unit 120 to output light.

The processor 130 may acquire current information for driving each of the plurality of backlight blocks, and drive the backlight unit 120 based on the acquired current information. For example, the processor 130 adjusts the current information for driving each of the plurality of backlight blocks, e.g., at least one of the provision time or strength of a driving current (or a driving voltage), and outputs the current. Here, each of the backlight blocks may include at least one light source, e.g., a plurality of light sources.

Specifically, the processor 130 may control the luminance of the light sources of the backlight unit 120 by controlling the luminance of the light sources included in the backlight unit 120, or varying the strength of the current with a pulse width modulation (PWM) wherein a duty ratio varies. Here, a pulse width modulation (PWM) signal controls the ratio of lighting and turning off of the light sources, and the duty ratio thereof (%) is determined according to a dimming value input from the processor 130.

In this case, the processor 130 may be implemented in a form of including a driver IC for driving the backlight unit 120. For example, the processor 130 may be implemented as a DSP, and may also be implemented as a digital driver IC and one chip. The driver IC can obviously be implemented as separate hardware from the processor 130. For example, in case the light sources included in the backlight unit 120 are implemented as LED elements, the driver IC may be implemented as at least one LED driver controlling a current applied to the LED elements. According to an embodiment, the LED driver may be provided on the rear end of a power supply (e.g., a switching mode power supply (SMPS)), and may receive a voltage from the power supply. However, according to another embodiment, the LED driver may also receive a voltage from a separate power device. Alternatively, it is also possible that the SMPS and the LED driver are implemented in a form of one integrated module.

The processor 130 acquires current information for driving the backlight unit 120, e.g., a current dimming value (or a dimming ratio or a current duty or a lighting duty of a current). For example, the processor 130 may acquire a backlight value (or a light amount value) based on pixel information (or a physical pixel amount) of an input image, and acquire a current dimming value for driving the backlight unit 120 based on the backlight value. Here, the pixel information may be at least one of an average pixel value, a maximum pixel value (or a peak pixel value), a minimum pixel value, a median pixel value, or an average picture level (APL) of the input image. Alternatively, the pixel information may be at least one of an average pixel value, a maximum pixel value (or a peak pixel value), a minimum pixel value, a median pixel value, or an APL of each image block area included in the input image. In this case, a pixel value may include at least one of a luminance value (or a gray scale value) or a color coordinate value. Hereinafter, explanation will be described based on the assumption of a case of using the APL as the pixel information, for the convenience of explanation. Also, a backlight value may be defined as values in various forms to which the pixel information is reflected. For example, the backlight value may be defined as values in various types that can indicate a relative light amount such as a value of multiplying a pixel value by a specific constant, a value of expressing a pixel value as a ratio, etc.

The processor 130 may acquire a current dimming value for driving the backlight unit 120 for each section based on the pixel information, e.g., the APL information for each predetermined section of the input image. Here, the predetermined section may become a frame unit, but is not limited thereto, and it is also possible that the predetermined section becomes a plurality of frame sections, scene sections, etc. In this case, the processor 130 may also acquire a current dimming value based on the pixel information on the basis of a predetermined function (or an operation), but current dimming information according to the pixel information may also have been stored in advance, for example, in a form of a lookup table or a graph.

For example, the processor 130 may convert pixel data for each frame (RGB) into a luminance level according to a predetermined conversion function, and divide the sum of the luminance levels by the entire pixel number, and calculate the APL for each frame. However, the disclosure is not limited thereto, and the conventional various methods of calculating an APL can obviously be used. Then, the processor 130 may determine a current dimming value corresponding to each APL value by using a function that controls a current dimming value in an image frame wherein the APL is a predetermined value (e.g., 80%) to 100%, and reduces a current dimming value of an image frame having an ALP value of 80% or lower to be inverse proportional to the APL value linearly or nonlinearly.

In case a current dimming value corresponding to an APL value is stored in a lookup table, the current dimming value may be read from the lookup table by using the APL as the read address.

The processor 130 may drive the backlight unit 120 by local dimming of identifying a screen as a plurality of areas and independently controlling the backlight luminance for each area or global dimming of controlling the lighting time of the backlight of an entire screen integrally.

According to an embodiment, the processor 130 may drive the backlight unit 120 by a local dimming method. In this case, the processor 130 may acquire current dimming values corresponding to the plurality of backlight blocks constituting the backlight unit 120, and independently control each of the plurality of backlight blocks based on the acquired current dimming values.

Figure 3A:
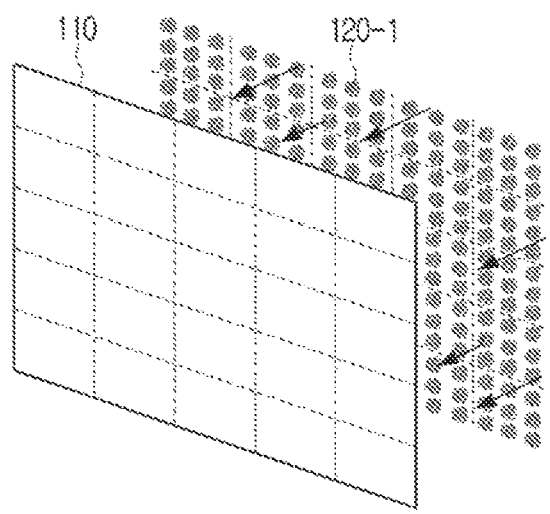
FIG. 3A and FIG. 3B are diagrams for illustrating a local dimming method according to an embodiment.

According to an embodiment, in case the backlight unit 120 is implemented as a direct type backlight unit 120-1 as illustrated in FIG. 3A, the direct type backlight unit 120-1 may be implemented as a structure wherein a plurality of optical sheets and a diffusing plate are laminated in the lower part of the display panel 110, and a plurality of light sources are arranged in the lower part of the diffusing plate. In the case of the direct type backlight unit 120-1, it may be divided into a plurality of backlight blocks as illustrated in FIG. 3A based on the arrangement structure of the plurality of light sources, and the plurality of backlight blocks may be independently controlled.

Figure 3B:
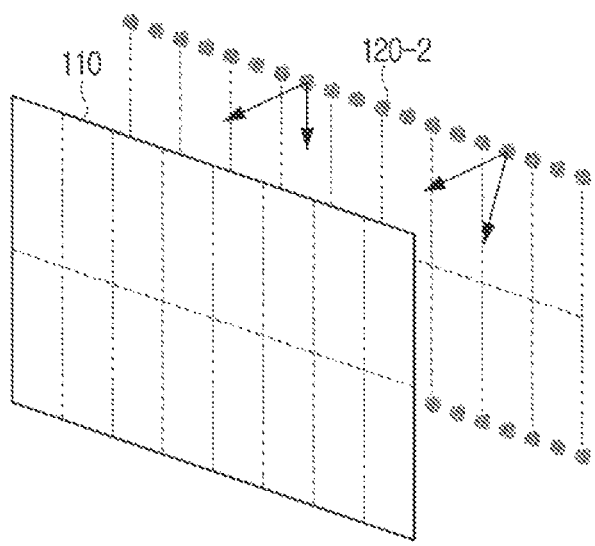

According to another embodiment, the backlight unit 120 may be implemented as an edge type backlight unit 120-2 as illustrated in FIG. 3B. For example, the edge type backlight unit 120-2 may be implemented as a structure wherein a plurality of optical sheets and a light guide plate are laminated in the lower part of the display panel 110, and a plurality of light sources are arranged on the side surface of the light guide plate. In the case of the edge type backlight unit 120-2, it may be divided into a plurality of backlight blocks as illustrated in FIG. 3B based on the arrangement structure of the plurality of light sources, and the plurality of backlight blocks may be independently controlled.

According to another embodiment, the processor 130 may control the backlight unit 120 by global dimming. In case the backlight unit 120 is implemented as a direct type backlight unit 120-1 or an edge type backlight unit 120-2, the plurality of backlight blocks may not be independently controlled, and the lighting time of the backlight may be controlled integrally.

Returning to FIG. 2, according to an embodiment of the disclosure, if an image of a first resolution (referred to as a first resolution image hereinafter) is input, the processor 130 may adjust the image to an image of a second resolution (referred to as a second resolution image hereinafter) smaller than the first resolution. For example, the first resolution image may be the first image 10 in FIG. 1, and the second resolution image may be the second image 20 in FIG. 1. Hereinafter, explanation will be described based on the assumption that the first resolution image is the first image 10 in FIG. 1, and the second resolution image is the second image 20 in FIG. 1, for the convenience of explanation.

Then, the processor 130 may divide an image area corresponding to a first backlight block among the plurality of backlight blocks in the second resolution image 20 into a plurality of image areas, and acquire current information corresponding to the first backlight block and a second backlight block based on the plurality of image areas. Here, the second backlight block may be a block adjacent to the first backlight block. For example, the second backlight block may be a block adjacent to the first backlight block in a vertical direction.

According to an embodiment, the processor 130 may acquire the second resolution image 20 (the second image 20 having the second resolution) by maintaining the horizontal resolution of the first resolution image 10 (the first image 10 having the first resolution) and reducing the vertical resolution. Accordingly, the horizontal resolution of the second resolution image 20 may be identical to the horizontal resolution of the first resolution image 10, and the vertical resolution of the second resolution image 20 may correspond to an N equal division value of the vertical resolution of the first resolution image 10.

Specifically, the processor 130 may divide an image area corresponding to the first backlight block in the second resolution image 20 into N image areas, and acquire current information corresponding to the first backlight block and N−1 backlight blocks adjacent to the first backlight block in a vertical direction based on the divided N image areas. According to an embodiment, in case the vertical resolution of the second resolution image 20 is ½ of the vertical resolution of the first resolution image, the processor 130 may divide each of the image areas corresponding to a backlight block into two image areas, and acquire current information corresponding to the backlight block and another one backlight block adjacent to the backlight block in a vertical direction based on the divided two image areas.

Figure 4A:
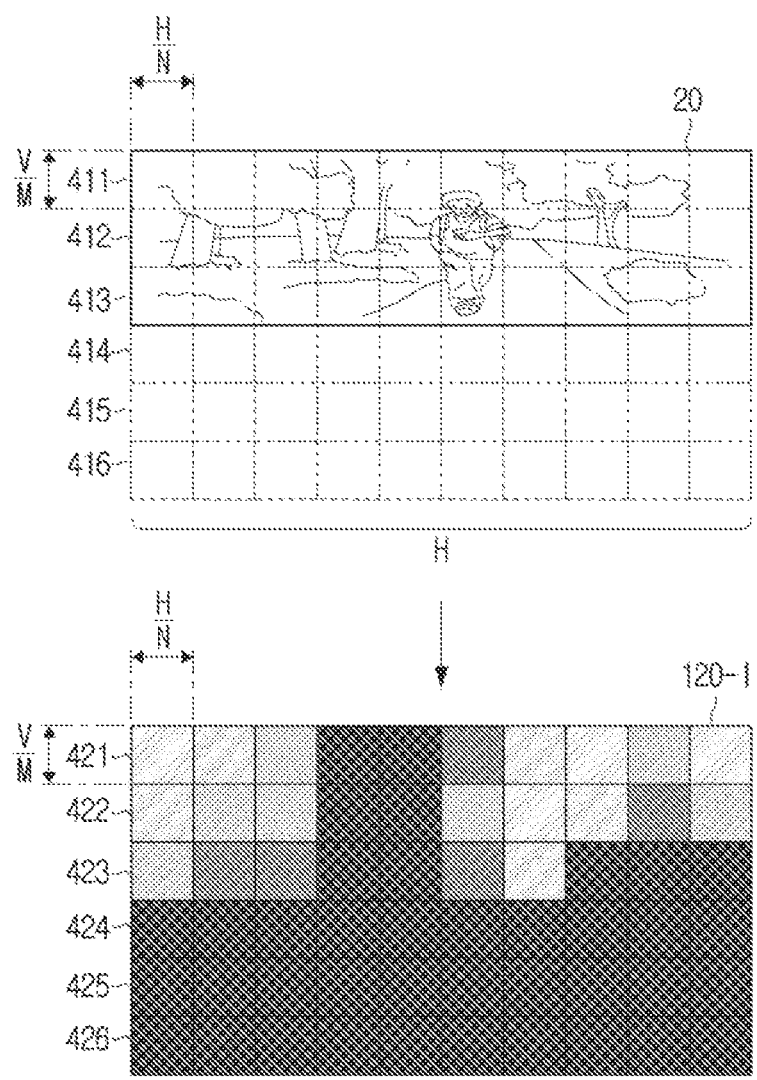
FIG. 4A and FIG. 4B are diagrams for illustrating a local dimming method of a direct type backlight unit according to an embodiment.
Figure 4B:
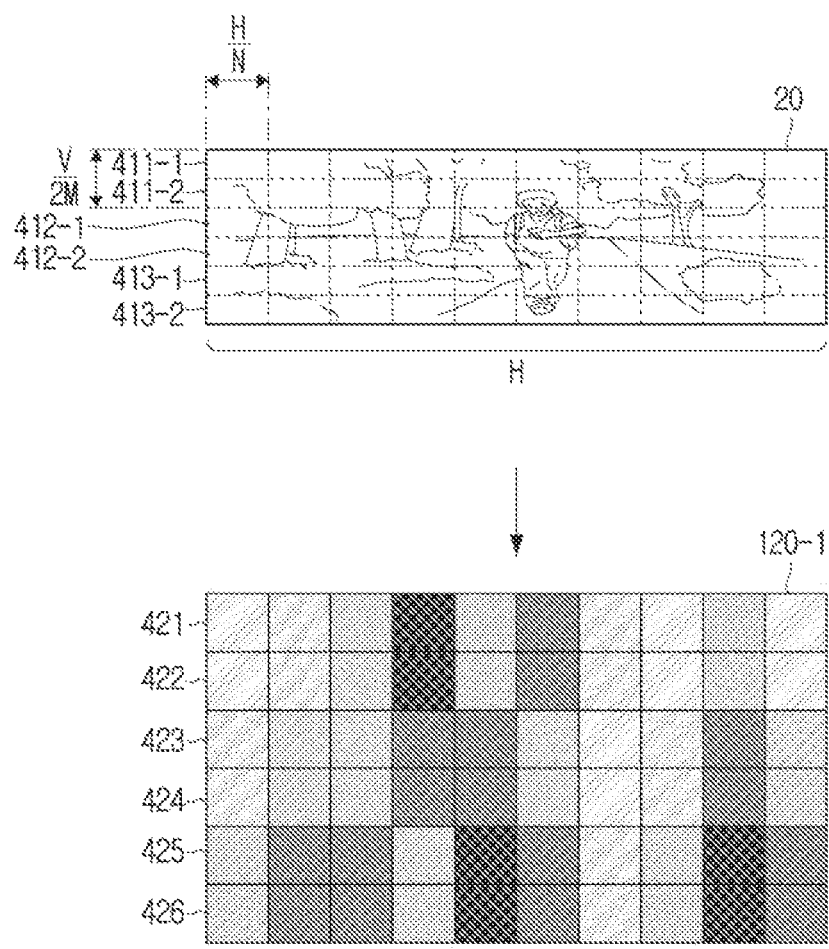

FIG. 4A and FIG. 4B are diagrams for illustrating a local dimming method of a direct type backlight unit according to an embodiment.

According to an embodiment, in case the vertical resolution of an input image, i.e., the first resolution image 10 is reduced to ½, when a backlight value is calculated, the backlight value for the remaining vertical resolution may be calculated while a default value, e.g., a value corresponding to a black pixel is applied, and thus a dark image compared to the input image is provided. For example, as illustrated on the left side of FIG. 4A, in the case of calculating the backlight values of the backlight blocks 421 to 426 of the first vertical line among the plurality of backlight blocks included in the direct type backlight unit 120-1, the backlight values for some backlight blocks 421, 422, 423 are calculated based on the corresponding image areas 411, 412, 413 in the second resolution image 20. However, for the remaining backlight blocks 424, 425, 426 of the first vertical line, there are no corresponding image areas, and thus a default value, e.g., a value corresponding to a black pixel is calculated as a backlight value. Accordingly, a dark image compared to the input image or an image of distorted brightness compared to the input image is output.

However, according to an embodiment of the disclosure, current information corresponding to each backlight block may be acquired by the method as illustrated in FIG. 4B.

Specifically, the processor 130 may divide the image area 411 corresponding to the first backlight block in the second resolution image 20 into two image areas 411-1, 411-2, and acquire current information corresponding to the first backlight block 421 and the second backlight block 422 adjacent to the first backlight block in a vertical direction based on the divided two image areas 411-1, 411-2. Also, the processor 130 may acquire current information for the remaining backlight blocks 423, 424, 425, 426 . . . by the same method. For example, the processor 130 may divide the image area 411 corresponding to the second backlight block in the second resolution image 20 into two image areas 411-1, 411-2, and acquire current information corresponding to the third backlight block 423 and the fourth backlight block 424 adjacent to the third backlight block in a vertical direction based on the divided two image areas 411-1, 411-2. Accordingly, even if the resolution of an input image is reduced, the brightness of an output image can maintain a threshold range based on the brightness of the input image.

In the aforementioned embodiment, it was described that the backlight unit 120 is divided into 10*6(horizon*vertical) backlight blocks, but this is for the convenience of explanation, and the number of the backlight blocks can obviously be diverse according to the size of the display apparatus 100, the type of the backlight unit 120 (a direct type or an edge type), etc.

Figure 5A:
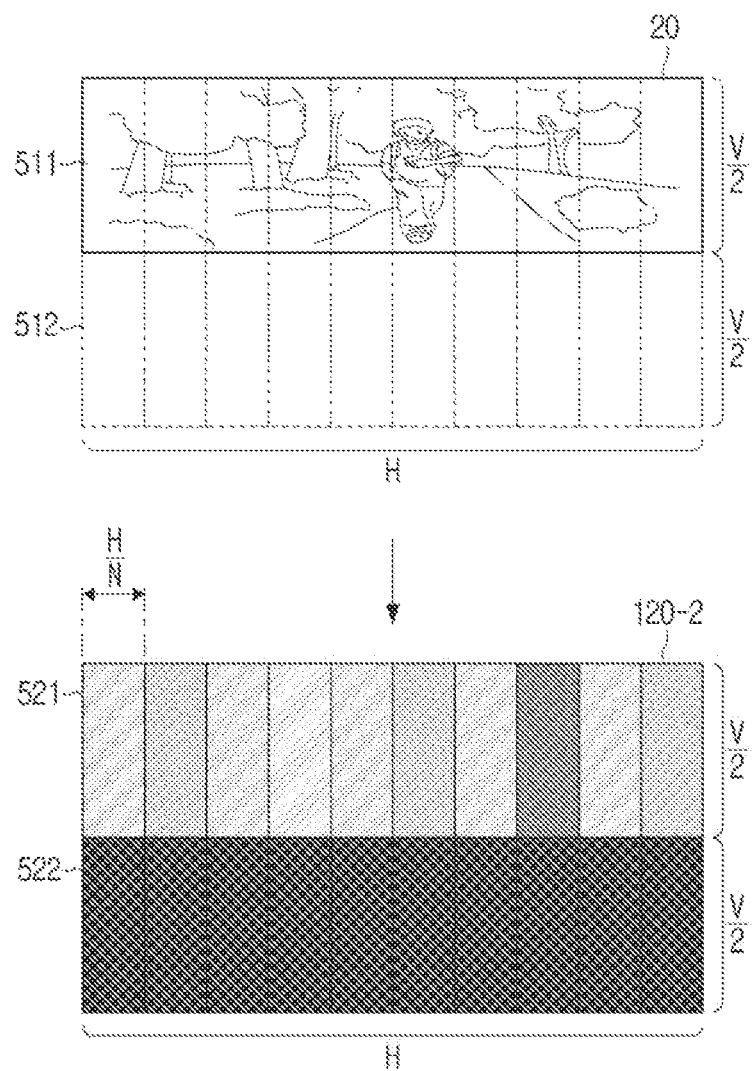
FIG. 5A and FIG. 5B are diagrams for illustrating a local dimming method of an edge type backlight unit according to an embodiment.
Figure 5B:
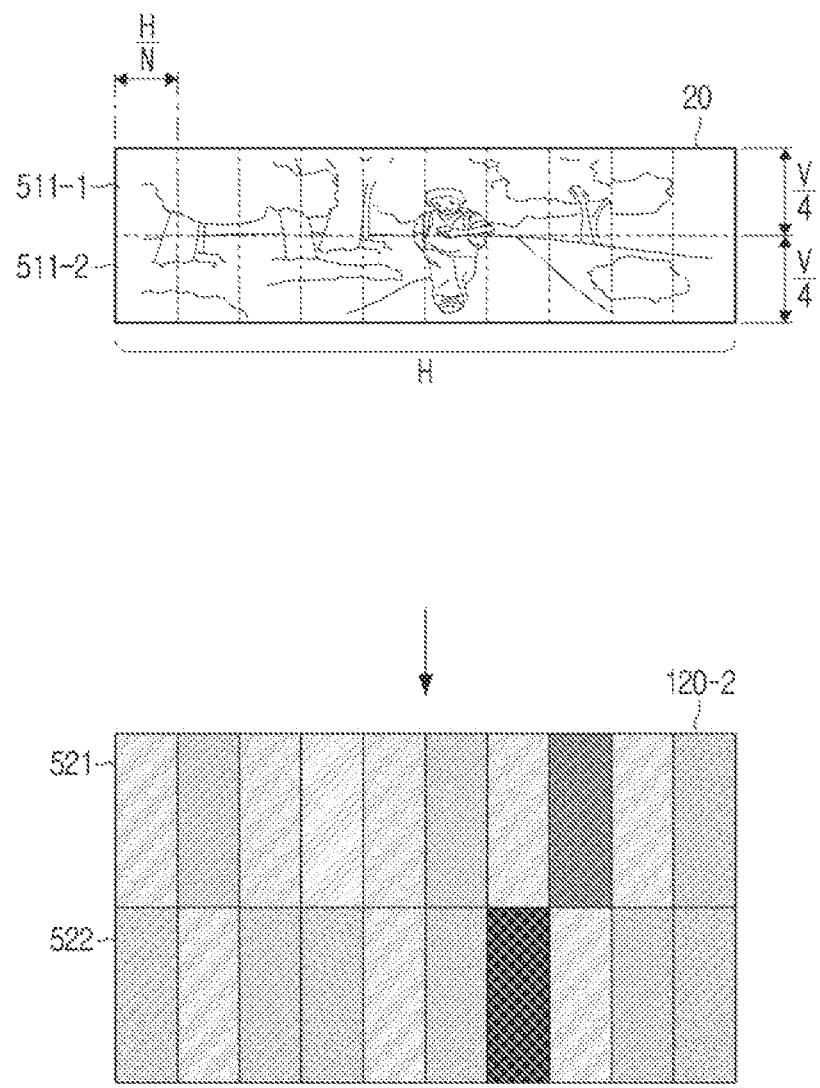

FIG. 5A and FIG. 5B are diagrams for illustrating a local dimming method of an edge type backlight unit according to an embodiment.

As in the example illustrated in FIG. 4A, in the case of calculating the backlight values of the backlight blocks 521, 522 of the first vertical line among the plurality of backlight blocks included in the edge type backlight unit 120-2 as illustrated in FIG. 5A, backlight values are calculated for some backlight blocks 521 based on the corresponding image area 511 in the second resolution image 20. For the remaining backlight blocks 522 of the first vertical line, there is no corresponding image area, and thus a default value, e.g., a value corresponding to a black pixel is calculated as a backlight value. Accordingly, a dark image compared to the input image or an image of distorted brightness compared to the input image is output.

However, according to an embodiment of the disclosure, current information corresponding to each backlight block may be acquired by the method as illustrated in FIG. 5B.

Specifically, the processor 130 may divide the image area 511 corresponding to the first backlight block 521 in the second resolution image 20 into two image areas 511-1, 511-2, and acquire current information corresponding to the first backlight block 521 and the second backlight block 522 adjacent to the first backlight block in a vertical direction based on the divided two image areas 511-1, 511-2. Also, the processor 130 may acquire current information for the remaining backlight blocks by the same method. Accordingly, even if the resolution of an input image is reduced, the brightness of an output image can maintain a threshold range based on the brightness of the input image.

Figure 6A:
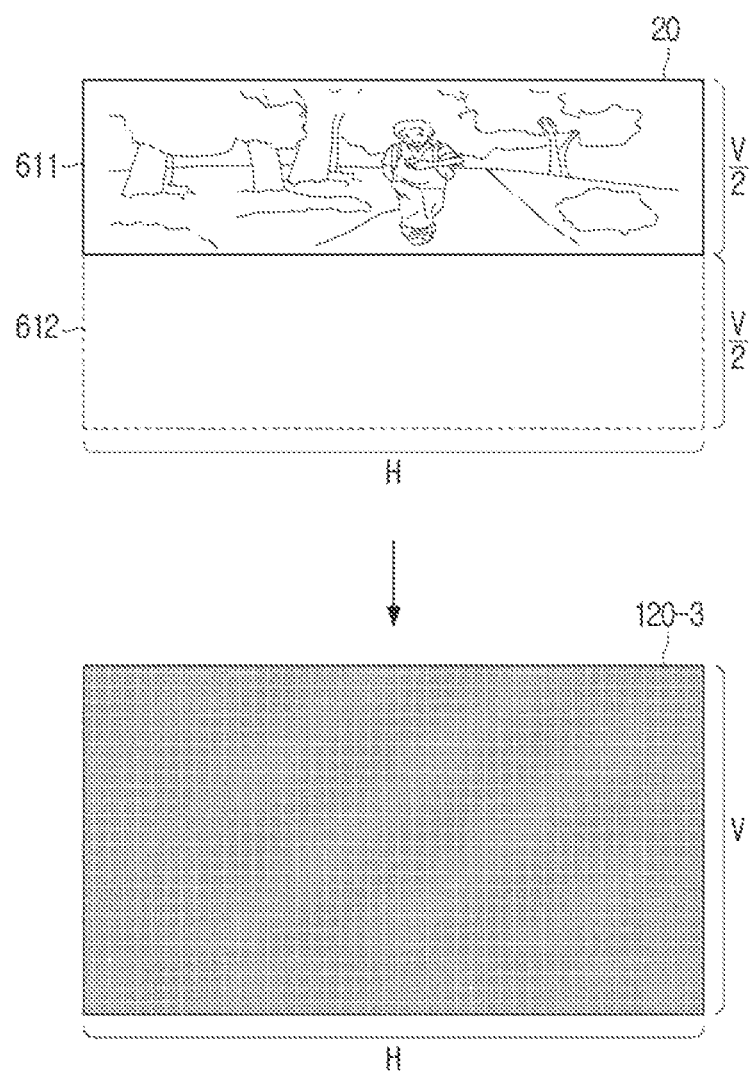
FIG. 6A and FIG. 6B are diagrams for illustrating a global dimming method of a backlight unit according to an embodiment.
Figure 6B:
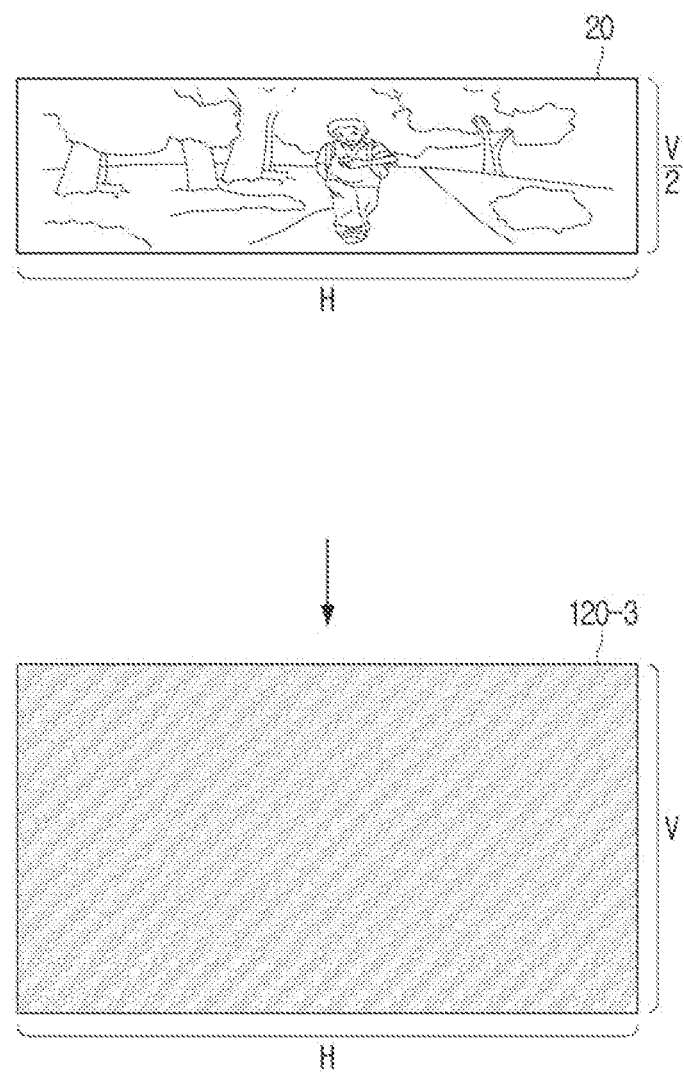

FIG. 6A and FIG. 6B are diagrams for illustrating a global dimming method of a backlight unit according to an embodiment.

As illustrated in FIG. 6A, according to a genera global dimming method, a backlight value is calculated based on the brightness of the area 611 corresponding to the second image 20 and the brightness of the remaining area 612. Thus, the backlight value of the backlight unit 120-3 gets to have dark brightness compared to the input image or distorted brightness compared to the input image.

However, according to an embodiment of the disclosure, the backlight value of the backlight unit 120-3, e.g., the current dimming value (or the current ratio) is calculated based on the second image 20 as illustrated in FIG. 6B, and thus the brightness of an output image can maintain a threshold range based on the brightness of an input image.

Figure 7A:
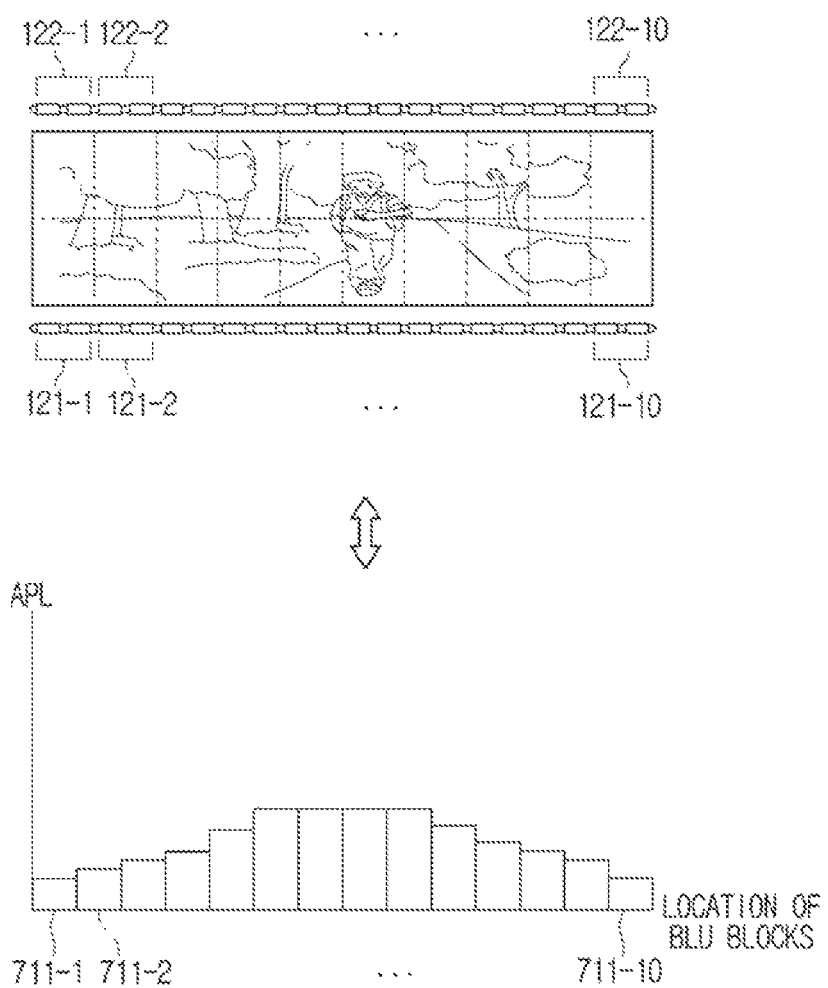
FIG. 7A and FIG. 7B are diagrams for illustrating a method of acquiring a current dimming value corresponding to each backlight block according to an embodiment of the disclosure.
Figure 7B:
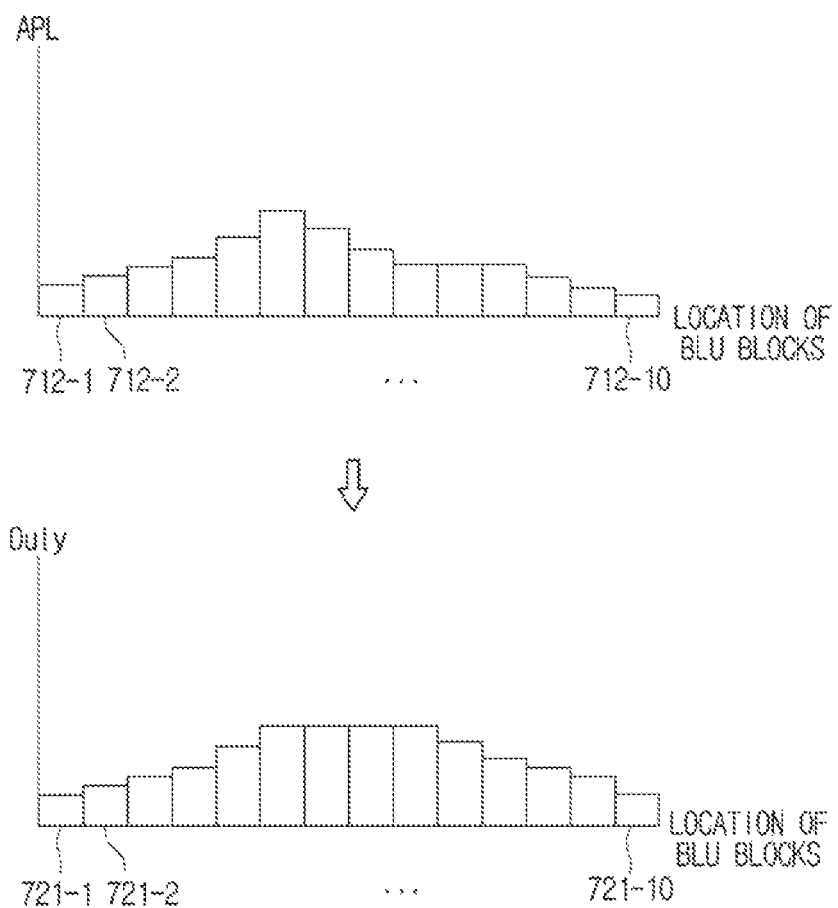

FIG. 7A and FIG. 7B are diagrams for illustrating a method of acquiring a current dimming value corresponding to each backlight block according to an embodiment of the disclosure. For the convenience of explanation, the embodiment illustrated in FIG. 5B will be cited.

According to an embodiment, the processor 130 may acquire pixel information, e.g., APL information of each area corresponding to each backlight block of the backlight unit 120, and calculate the current dimming value (or the current duty) of each backlight block based on the acquired pixel information.

For example, as illustrated on the right side of FIG. 7A, the processor 130 may calculate the APL information of image areas corresponding to each backlight block 121-1 to 121-10. For example, the left side of FIG. 4B illustrates a case wherein the APL values 411-1 to 411-N of each divided area of the second resolution image 20 corresponding to each backlight block 121-1, 121-2, . . . 121-10 included in the lower edge are calculated according to an embodiment. Then, as illustrated in FIG. 7B, the processor 130 may calculate the current dimming values 721-1 to 721-10 of each backlight block 121-1 to 121-10 based on the APL values of each image area acquired in FIG. 7A. For example, the processor 130 may calculate the current dimming values of each lower backlight block 121-1 to 121-10 by applying a predetermined weight to the APL value of each image area. For example, the processor 130 may calculate the current dimming value of an image area of which APL is 10% as 10%*6=60%, and calculate the current dimming value of an image area of which APL is 7% as 7%*6=42%. However, this is merely an example of calculating a current dimming value, and a current dimming value can be calculated by various methods based on pixel information of each image area.

According to an embodiment, the processor 130 may align the current dimming values corresponding to each backlight block according to the connection order of each backlight block, and provide the values to a local dimming driver. In this case, the local dimming driver generates a pulse width modulation (PWM) signal having each current dimming value provided from the processor 130, and sequentially drives each backlight block based on the generated PWM signal. According to another embodiment, the processor 130 may generate a PWM signal based on a calculated current dimming value, and provide the signal to the dimming driver.

According to an embodiment of the disclosure, when a current dimming value for driving the backlight unit 120 is acquired, the processor 130 may determine the frame rate of a second resolution image based on the first resolution and the second resolution, and adjust the backlight dimming frequency, i.e., the output interval (or the output time interval) of the current dimming value based on the frame rate of the second resolution image. In the case of using the backlight dimming method, a backlight dimming frequency (referred to as a dimming frequency hereinafter) is also determined based on the frame rate of the input image. According to an embodiment, a backlight dimming frequency may be N times (N is an inter greater than or equal to 1) of the frame rate of the input image. Here, the N value may be a value that was set at the time of manufacture, or a value that was set by a user. Depending on cases, it is also possible that the N value is determined based on a type of an image or the characteristic of the panel. However, according to an embodiment, if the resolution of an input image is adjusted, the processor 130 may adjust the dimming frequency based on the determined dimming frequency.

According to an embodiment, in case the vertical resolution of the second resolution image 20 corresponds to the N equal division value of the vertical resolution of the first resolution image 10, the processor 130 may determine the frame rate corresponding to the second resolution image as N times of the frame rate corresponding to the first resolution image. For example, in case the vertical resolution of the second resolution is ½ of the vertical resolution of the first resolution, the processor 130 may determine the frame rate corresponding to the second resolution image as two times of the frame rate corresponding to the first resolution image.

According to an embodiment, the processor 130 may convert a first resolution image into a second resolution image, and control the display panel 110 to output the converted second resolution image at a frame rate of 120 Hz. For example, the display apparatus 100 may be implemented to output a first resolution image (e.g., a resolution of 3840×2160) at the first frame rate (e.g., 60 Hz). In this case, the processor 130 may convert the first resolution image into a second resolution image (e.g., 3840×1080) according to a predetermined event, and control the display panel 110 to output the second resolution image at the second frame rate (e.g., 120 Hz). According to an embodiment, the processor 130 may repeatedly output the same second resolution image, but the disclosure is not limited thereto, and the image may be an interpolated image that is output in the second place according to another embodiment.

The display panel 110 according to an embodiment may include a plurality of gate lines and a plurality of data lines. A gate line is a line that transmits a refresh signal or a gate signal, and a data line is a line that transmits a data voltage. For example, each of the plurality of sub-pixels included in the display panel 110 may be connected with one gate line and one data line. In particular, each of the plurality of data lines may provide data to each of the pixels in the same column. In this case, the processor 130 may make two adjacent gate lines among the plurality of gate lines driven simultaneously, and output a second resolution image at the determined frame rate. That is, the processor 130 may display a second resolution image by providing the same data to two adjacent pixel lines among the plurality of pixel lines included in the display panel 110. Here, the plurality of pixel lines may mean pixel lines provided in a vertical direction (referred to as vertical pixel lines hereinafter) in the display panel 110.

According to an embodiment, the processor 130 may convert a first resolution image (e.g., a resolution of 3840× 2160) of the first frame rate (e.g., 60 Hz) into a second resolution image (e.g., 3840×1080), and control the display panel 110 to output the converted second resolution image at the second frame rate (e.g., 120 Hz). For example, the processor 130 may control the display panel 110 by outputting a vertical synchronization signal Vsync and a horizontal synchronization signal Hsync to the panel driver based on the second frame rate.

Also, the processor 130 may control the driving of the backlight unit 120 based on the second resolution image and the second frame rate. Specifically, the processor 130 may adjust an output interval of dimming frequencies, i.e., current dimming values corresponding to each backlight block based on current dimming values corresponding to each backlight block calculated based on the second resolution image and the second frame rate.

According to an embodiment, the processor 130 may output dimming control values corresponding to each backlight block to the backlight driver based on the second frame rate. Here, the dimming control values are values for adjusting the output interval (or the output time interval) of the current diming values corresponding to each backlight block, and they may be calculated based on the ratio of the second frame rate to the first frame rate. For example, in case the first frame rate is 60 Hz and the second frame rate is 120 Hz, a dimming control value may be 2×. Also, in case the first frame rate is 60 Hz and the second frame rate is 2400 Hz, a dimming control value may be 4×. That is, in case the frame rate increased, a dimming control value corresponding to the increased frame rate among various magnifications including 1×, 2×, 4×, etc. may be output to the backlight driver. According to an embodiment, in case a dimming frequency is set as N times (N is an integer greater than or equal to 1) of the frame rate of an input image, and a dimming control value is doubled (2×) according to adjustment of the resolution of the input image, the final dimming frequency may be determined as 2×n times.

Figure 8A:
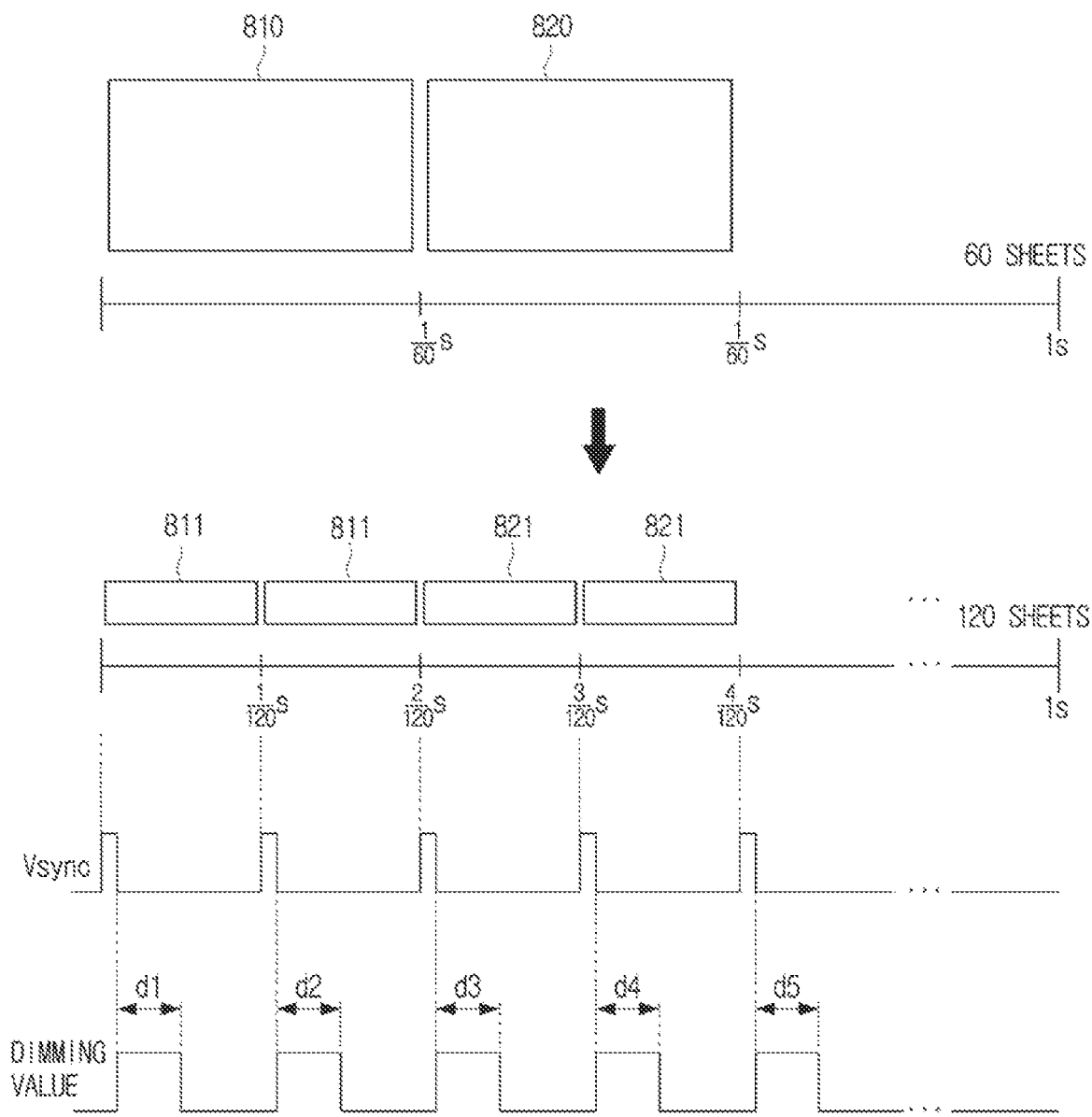
FIG. 8A and FIG. 8B are diagrams for illustrating an image output method according to an embodiment.
Figure 8B:
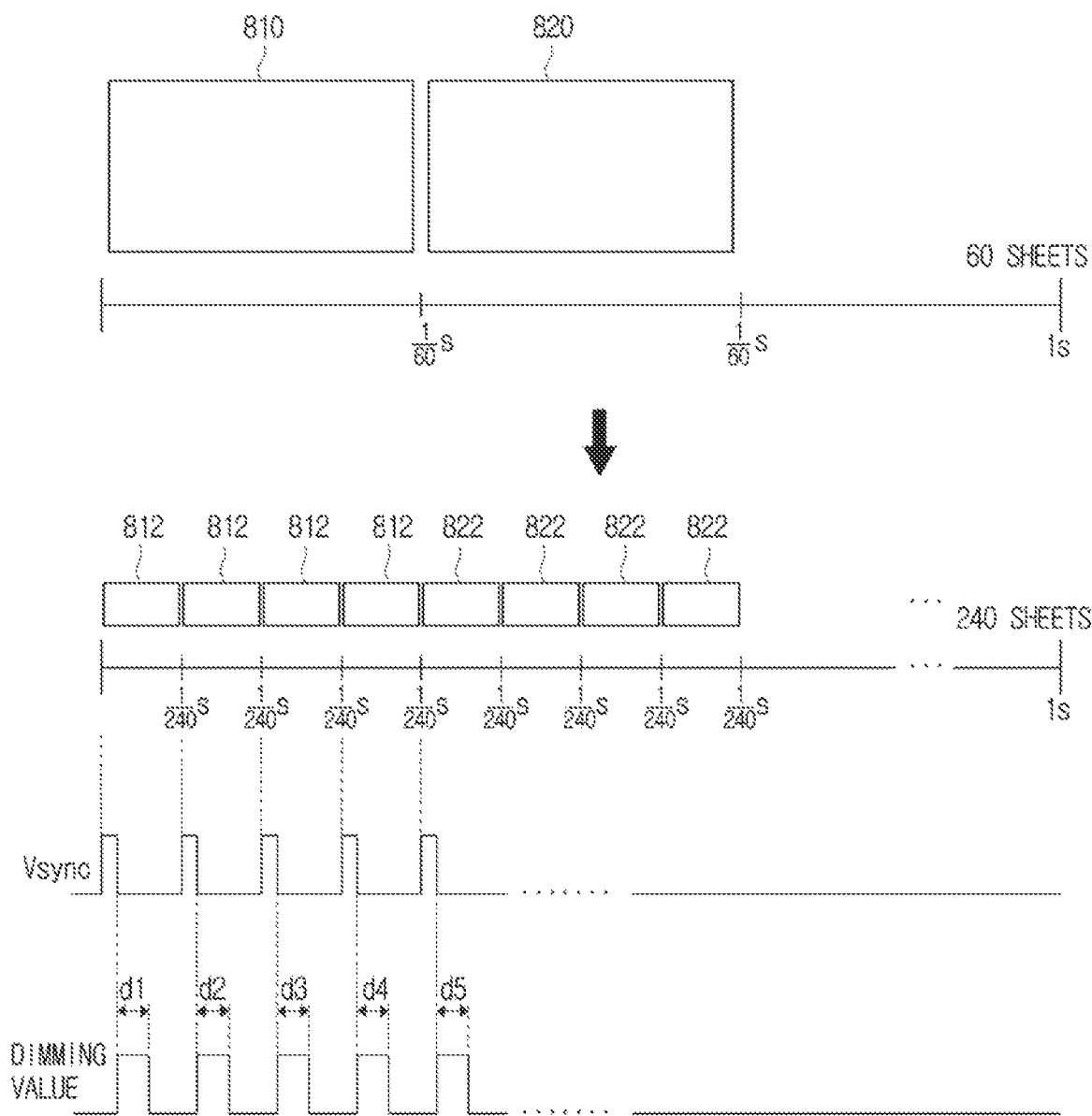

FIG. 8A and FIG. 8B are diagrams for illustrating an image output method according to an embodiment.

According to an embodiment, in case the display apparatus 100 operates according to a dual line gating (referred to as DLG hereinafter) mode, the frame rate increases, and thus the output interval of current dimming values also increases. In this case, as the output interval of the current dimming values corresponding to each backlight block increases, the effective dimming time corresponding to each backlight block decreases in proportion thereto. Here, the effective diming time may be the time when current dimming is effective in each backlight block.

According to an embodiment, in case an input image is output at 60 Hz without a change in the resolution as illustrated in FIG. 8A, the frames 810, 820, . . . may be output per 16.67 ms, and the effective dimming time of each backlight block may be controlled to correspond to the resolution of the input image.

However, in case DLG is applied and an output image is output at 120 Hz, the frames 811, 811, 821, 821 are input per 8.33 ms and the vertical resolution of the output image decreases to half compared to the input image, and the frame rate increases accordingly, and thus the effective dimming time of each backlight block may decrease to correspond thereto. For example, as illustrated in FIG. 8A, the processor 130 may convert first resolution images (first images having the first resolution) 810, 820 into second resolution images (second images having the second resolution) 811, 821, and output the second resolution images 811, 821 at 120 Hz.

In this case, the processor 130 may output a dimming control value for driving of the backlight unit 120 based on a synchronization signal corresponding to the frame rate converted into two times (2×), in particular, a vertical synchronization signal Vsync. That is, in the case of outputting a second resolution image at a frame rate of 120 Hz, the processor 130 may output a vertical synchronization signal Vsync corresponding to each frame at the speed of two times (2×), and also output the dimming control value at two times (2×) to correspond thereto, and accordingly, the current dimming values corresponding to each backlight block may also be output at an output interval of two times. Accordingly, the effective diming time of each backlight block may decrease.

As another example, as illustrated in FIG. 8B, in case an output image is output at 240 Hz, the frames 812, 812, 812, 912, 822, 822, 822, 822 are input per 4.16 ms, and thus the current dimming values corresponding to each backlight block may also be output at an output interval of four times. Accordingly, the effective dimming time of each backlight block may decrease.

As described above, the processor 130 may control the effective dimming time corresponding to each backlight block based on the resolution and the frame rate of an output image.

According to an embodiment of the disclosure, the display apparatus 100 may operate in one of a plurality of display modes. For example, the display apparatus 100 may operate in a first display mode or a second display mode based on a user input or a type of an input image.

According to an embodiment, if a first resolution image is input in the first display mode, the processor 130 may control the display panel 110 to output the first resolution image at the first frame rate, and drive the backlight unit 120 based on current information acquired based on the first resolution image and the first frame rate. Also, if a first resolution image is input in the second display mode, the processor 130 may convert the first resolution image into a second resolution image, control the display panel 110 to output the second resolution image at a second frame rate greater than the first frame rate, and drive the backlight unit 120 based on current information acquired based on the second resolution image and the second frame rate.

Figure 9A:
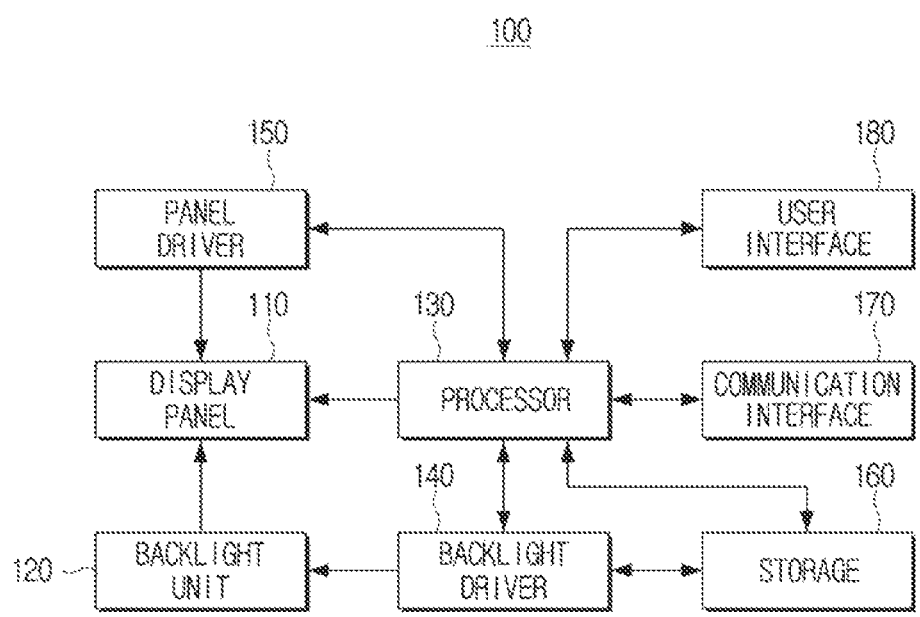
FIG. 9A and FIG. 9B are diagrams for illustrating a detailed configuration of an electronic apparatus according to an embodiment of the disclosure.
Figure 9B:
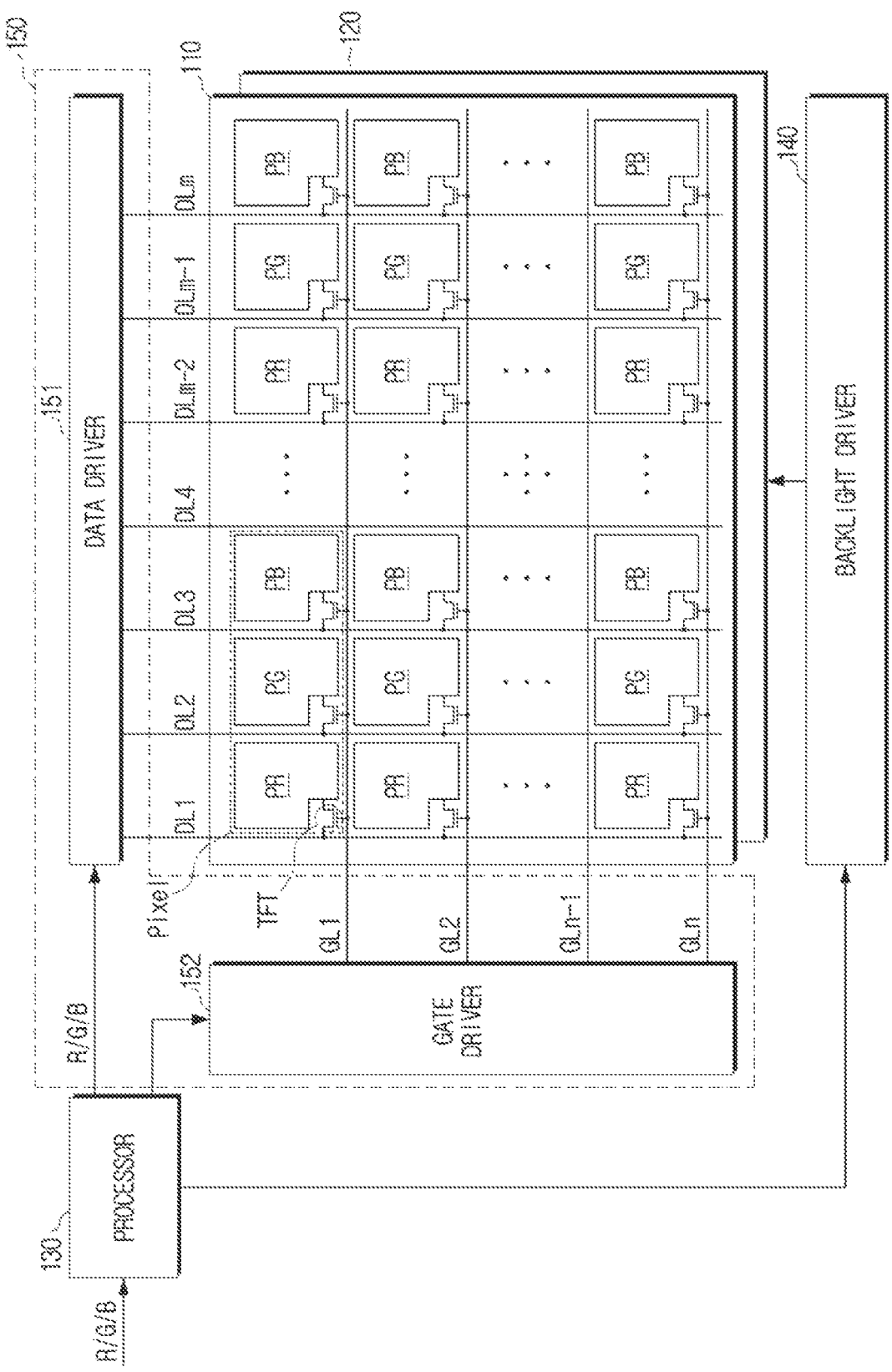

FIG. 9A and FIG. 9B are diagrams for illustrating a detailed configuration of an electronic apparatus according to an embodiment of the disclosure.

According to FIG. 9A, the electronic apparatus 100 includes a display panel 110, a backlight unit 120, a processor 130, a backlight driver 140, a panel driver 150, a memory 160, a communication interface 170, and a user interface 180. Among the components illustrated in FIG. 9A, regarding the components overlapping with the components illustrated in FIG. 2, detailed explanation will be omitted.

The display panel 110 is formed such that gate lines GL1 to GLn and data lines DL1 to DLm intersect with one another, and R, G, and B sub-pixels (PR, PG, PB) are formed in the area wherein the gate lines and the data lines are provided in an intersecting manner. Adjacent R, G, and B sub-pixels (PR, PG, PB) constitute one pixel. That is, each pixel includes an R sub-pixel (PR) displaying a red color (R), a G sub-pixel (PG) displaying a green color (G), and a B sub-pixel (PB) displaying a blue color (B), and reproduces the colors of a subject with the three primary colors of red (R), green (G), and blue (B).

In case the display panel 110 is implemented as an LCD panel, each sub-pixel (PR, PG, PB) includes a pixel electrode and a common electrode, and as the liquid crystal arrangement changes with an electric field formed due to a potential difference between the two electrodes, the light transmissivity changes. TFTs formed in the intersecting part of the gate lines GL1 to GLn and the data lines DL1 to DLm respectively respond to scan pulses from the gate lines GL1 to GLn, and provide video data from the data lines DL1 to DLm, i.e., the red (R), green (G), and blue (B) data to the pixel electrodes of each sub-pixel (PR, PG, PB).

The backlight driver 140 may be implemented in a form of including a driver IC for driving the backlight unit 120. According to an embodiment, the driver IC may be implemented as separate hardware from the processor 130. For example, in case the light sources included in the backlight unit 120 are implemented as LED elements, the driver IC may be implemented as at least one LED driver controlling a current applied to the LED elements. According to an embodiment, the LED driver may be provided on the rear end of a power supply (e.g., a switching mode power supply (SMPS)), and may receive a voltage from the power supply. However, according to another embodiment, the LED driver may also receive a voltage from a separate power device. Alternatively, it is also possible that the SMPS and the LED driver are implemented in a form of one integrated module.

The panel driver 150 may be implemented in a form of including a driver IC for driving the display panel 110. According to an embodiment, the driver IC may be implemented as separate hardware from the processor 130. For example, the panel driver 150 may include a data driver 151 providing video data to the data lines and a gate driver 152 providing scan pulses to the gate lines as illustrated in FIG. 9B.

The data driver 151 is a means for generating a data signal, and receives image data of R/G/B components from the processor 130 (or a timing controller) and generates a data signal. Also, the data driver 151 is connected with the data lines DL1, DL2, DL3, . . . , DLm of the display panel 110, and applies the generated data signal to the display panel 110.

The gate driver 152 (or a scan driver) is a means for generating a gate signal (or a scan signal), and is connected with the gate lines GL1, GL2, GL3, . . . , GLn and transmits a gate signal to a specific row of the display panel 110. To a pixel to which the gate signal is transmitted, the data signal output from the data driver 161 is transmitted.

Other than the above, the panel driver 150 may further include a timing controller. The timing controller may receive an input signal IS, a horizontal synchronization signal Hsync, a vertical synchronization signal Vsync, and a main clock signal MCLK, etc. from the outside, e.g., the processor 130, and generate an image data signal, a refresh control signal, a data control signal, a light emission control signal, etc., and provide the signals to the display panel 110, the data driver 151, the gate driver 152, etc.

The memory 160 stores various data necessary for the operations of the electronic apparatus 100.

In particular, the memory 160 stores data necessary for the processor 130 to perform various kinds of processing. As an example, the memory 160 may be implemented as an internal memory such as a ROM, a RAM, etc. included in the processor 130, or implemented as a separate memory from the processor 130. In this case, the memory 160 may be implemented in the form of a memory embedded in the electronic apparatus 100, or in the form of a memory that can be attached to or detached from the electronic apparatus 100, according to the usage of stored data. For example, in the case of data for operating the electronic apparatus 100, the data may be stored in a memory embedded in the electronic apparatus 100, and in the case of data for an extended function of the electronic apparatus 100, the data may be stored in a memory that can be attached to or detached from the electronic apparatus 100.

In the case of a memory embedded in the electronic apparatus 100, the memory may be implemented in forms such as a non-volatile memory, a volatile memory, a flash memory, a hard disk drive (HDD), or a solid state drive (SSD), etc., and in the case of a memory that can be attached to or detached from the electronic apparatus 100, the memory may be implemented in forms such as a memory card (e.g., a micro SD card, a USB memory, etc.), and an external memory that can be connected to a USB port (e.g., a USB memory), etc.

According to an embodiment, the memory 160 may store information such as information related to a diffusing filter according to an embodiment of the disclosure (e.g., a filter value of the diffusing filter), information related to a weight (e.g., a weight corresponding to at least one of a motion direction or a motion speed), etc. However, the information may also be received in real time from external apparatuses such as a set-top box, an external server, a user terminal, etc.

The communication interface 170 is a component that performs communication with various types of external apparatuses according to various types of communication methods.

According to an embodiment, the communication interface 170 may be implemented as an input/output interface of at least one of a high definition multimedia interface (HDMI), AV, Composite, a mobile high-definition link (MHL), a universal serial bus (USB), a display port (DP), Thunderbolt, a video graphics array (VGA) port, an RGB port, a D-subminiature (D-SUB), a digital visual interface (DVI), an optical port, or a component.

According to another embodiment, the communication interface 170 includes at least one of a Wi-Fi module, a Bluetooth module, an Ethernet communication module, or an infrared communication module. Here, each communication module may be implemented in the form of at least one hardware chip. A Wi-Fi module and a Bluetooth module perform communication by using a Wi-Fi method and a Bluetooth method, respectively. In the case of using a Wi-Fi module or a Bluetooth module, various types of connection information such as an SSID and a session key is transmitted and received first, and connection of communication is performed by using the information, and various types of information can be transmitted and received thereafter. An infrared communication module performs communication according to an infrared Data Association (IrDA) technology of transmitting data to a near field wirelessly by using infrared rays between visible rays and millimeter waves.

A wireless communication module may include at least one communication chip that performs communication according to various wireless communication protocols such as Zigbee, 3rd generation (3G), 3rd generation partnership project (3GPP), Long Term Evolution (LTE), LTE Advanced (LTE-A), 4th Generation (4G), 5th Generation (5G), etc. other than the aforementioned communication methods.

Other than the above, the communication interface 170 may include at least one of a local area network (LAN) module, an Ethernet module, or a wired communication module that performs communication by using a pair cable, a coaxial cable, or an optical fiber cable, etc.

According to another embodiment, in case at least some operations for calculating a current dimming value for local dimming are performed in an external apparatus (e.g., an external server), the information in that regard may be received through the communication interface 170.

The user interface 180 may be implemented as a device such as a button, a touch pad, a mouse, and a keyboard, or may be implemented as a touch screen that can perform the aforementioned display function and a manipulation input function together. Here, the button may be various types of buttons such as a mechanical button, a touch pad, a wheel, etc. formed in any areas such as the front surface part, the side surface part, the rear surface part, etc. of the exterior of the main body of the electronic apparatus 100.

Also, the user interface 180 may be implemented as a microphone, a camera, a motion sensor, etc. that enable voice recognition or motion recognition.

In addition, the user interface 180 may be implemented to receive a signal corresponding to a user input (e.g., a touch, a push, a touch gesture, a voice, or a motion) from an external control apparatus. In the case of receiving a user voice or a user motion from the external control apparatus, the user interface 180 can obviously be implemented as a microphone, a camera, a motion sensor, etc. on the external control apparatus.

In case the electronic apparatus 100 is implemented as a TV, it may further include a tuner, and the tuner may tune and select only the frequency of a channel intended to be received at the electronic apparatus 100 from a lot of radio wave components through amplification, mixing, resonance, etc. of a broadcast signal received via wire or wirelessly.

Other than the above, the electronic apparatus 100 may further include various components such as a camera, a microphone, a speaker, a motion sensor, a location sensor, a touch sensor, a proximity sensor, etc. depending on implementation examples of the electronic apparatus 100.

Figure 10:
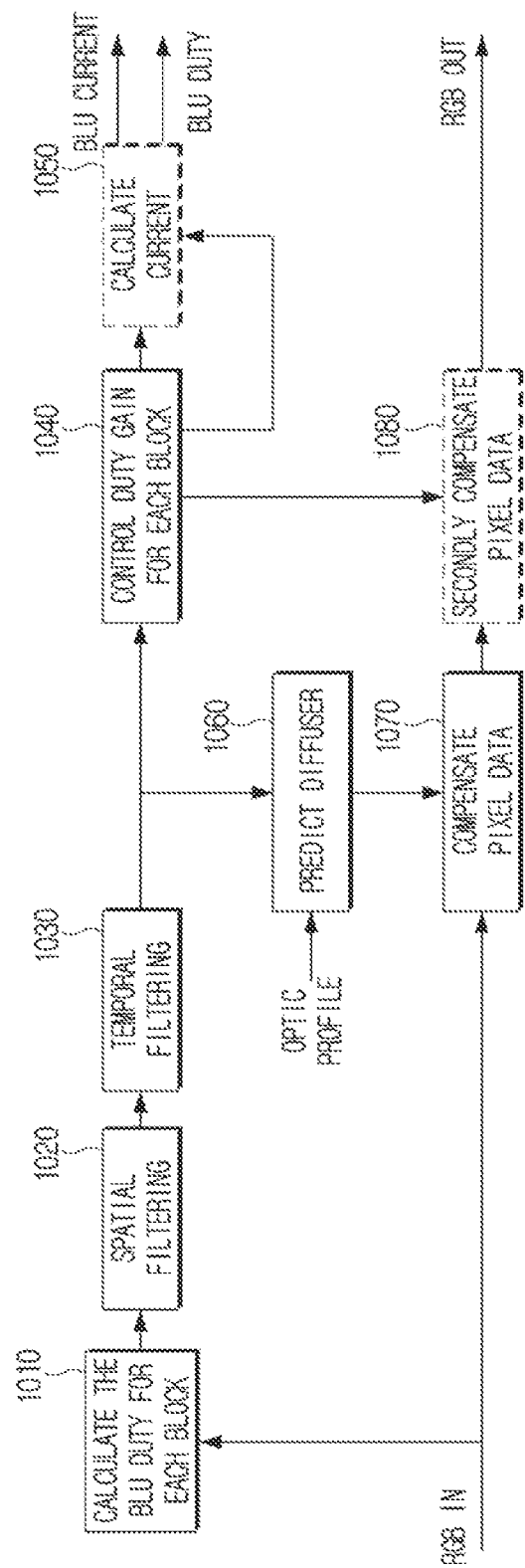
FIG. 10 is a block diagram for sequentially illustrating an image processing operation according to an embodiment of the disclosure.

FIG. 10 is a block diagram for sequentially illustrating an image processing operation according to an embodiment of the disclosure.

According to an embodiment of the disclosure, the processor 130 calculates current dimming values for each backlight block according to the aforementioned embodiment (1010).

Then, the processor 130 may perform spatial filtering for reducing the difference in dimming between each backlight block (1020).

Figure 11A:
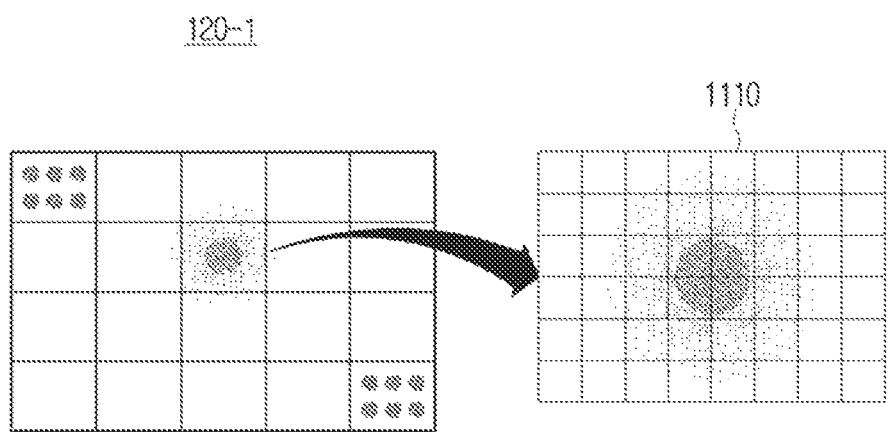
FIG. 11A and FIG. 11B are diagrams for illustrating a spatial filtering method according to an embodiment of the disclosure.
Figure 11B:
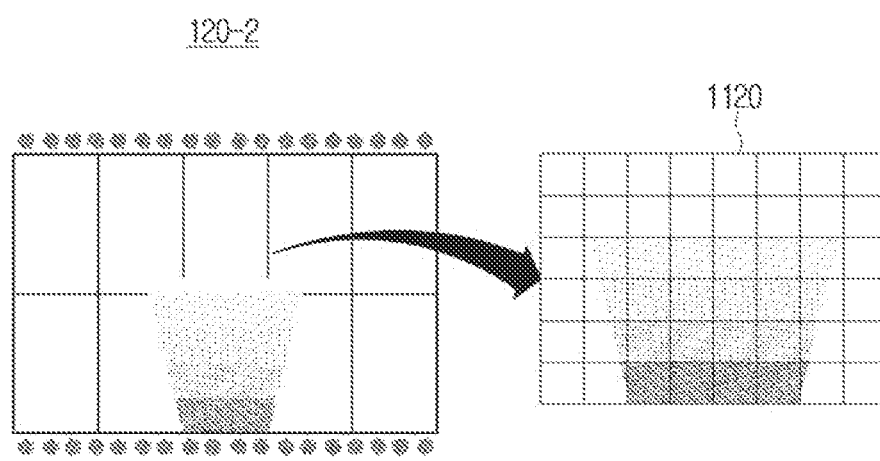

FIG. 11A and FIG. 11B are diagrams for illustrating a spatial filtering method according to an embodiment of the disclosure.

When local dimming is performed, a halo phenomenon may occur due to the difference in dimming between each backlight block. For preventing occurrence of such a phenomenon, according to an embodiment of the disclosure, the processor 130 may perform spatial filtering (or duty spread adjustment) for the current diming values for each block for alleviating the difference in dimming between each backlight block. For example, the processor 130 may adjust a current dimming value of a block based on the current dimming values of adjacent blocks of each backlight block. For example, by a filtering method of applying a spatial filter having a window of a specific size (e.g., a 3×3 size) by adding a specific weight to the current dimming values of each of eight blocks adjacent to the current dimming value of the present block in upper, lower, left, and right directions, the current dimming value of the present block may be adjusted, and the difference in dimming between adjacent blocks can thereby be alleviated.

Also, the processor 130 may perform temporal filtering for reducing the difference in luminance according to a change of an image (1030). In general, when local dimming is performed, a flicker phenomenon may occur due to the difference in luminance according to a change of an image. For preventing occurrence of such a phenomenon, according to an embodiment of the disclosure, the processor 130 may perform temporal filtering such that the change in the luminance of the backlight unit 120 according to the image frame occurs smoothly. For example, the processor 130 may compare the Nth dimming data corresponding to the present frame and the N−1th dimming data corresponding to the previous frame, and perform filtering according to the comparison result such that the change in the luminance of the backlight unit 120 occurs slowly during a specific time.

Then, the processor 130 may control (or adjust) gains to be applied to the current dimming values for each backlight block based on the filtering result (1040). Also, in case it is necessary, the processor 130 may adjust the size of a current based on a duty reduced by the gain control of the 1040 block.

The processor 130 may compensate pixel data based on a light profile of the backlight unit 120. Specifically, the processor 130 may analyze the light profile of the backlight light source and predict (1060) light diffuser, and compensate the pixel data based on the prediction result (1070).

FIG. 11A illustrates the light profile 1110 of the light source of the direct type backlight unit 120-1 according to an embodiment of the disclosure, and FIG. 11B illustrates the light profile 1120 of the light source of the edge type backlight unit 120-2 according to another embodiment of the disclosure. The processor 130 may compensate the pixel data by predicting light diffuser based on the light profile of each backlight block or each light source included in each backlight block as illustrated in FIG. 11A and FIG. 11B. For example, in case a light diffusion value influencing a specific pixel is high, the processor 130 may adjust the gray scale value of the pixel to be reduced.

Also, in case it is necessary, the processor 130 may additionally compensate the pixel data compensated in the 1070 block for compensating the change in the luminance according to the control of the current dimming value (1080).

However, processing of all blocks illustrated in FIG. 10 does not have to be necessarily applied essentially, and depending on embodiments, it is obvious that processing of some blocks can be omitted, or some processing can be added.

Figure 12:
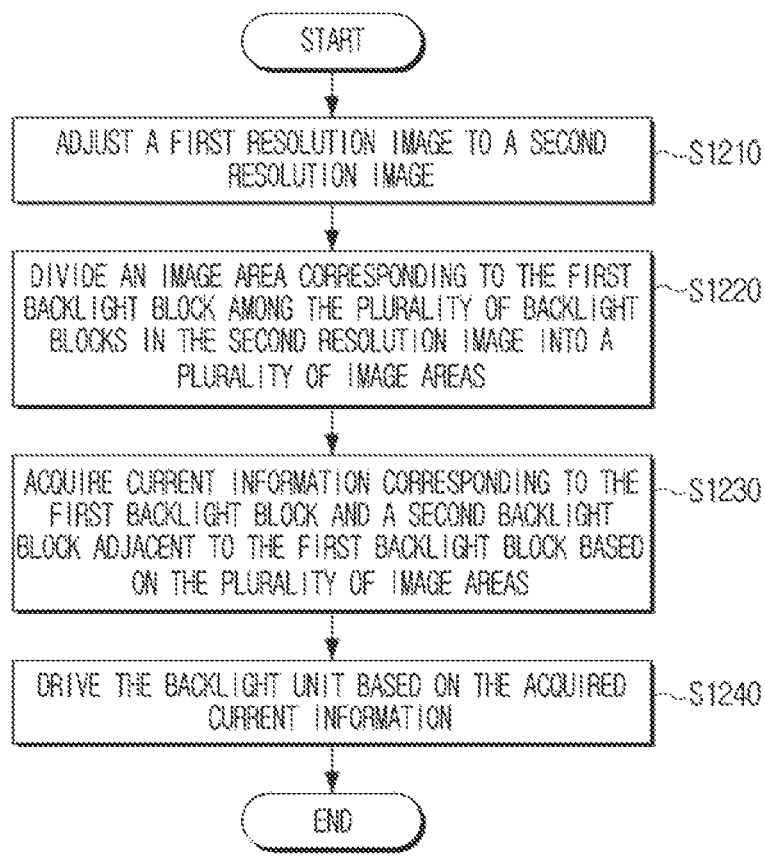
FIG. 12 is a flow chart for illustrating a method of controlling a display apparatus according to an embodiment of the disclosure.

FIG. 12 is a flow chart for illustrating a method of controlling a display apparatus according to an embodiment of the disclosure.

According to a method of controlling a display apparatus including a display panel and a backlight unit consisting of a plurality of backlight blocks illustrated in FIG. 12, first, an image of a first resolution is adjusted to an image of a second resolution smaller than the first resolution in operation S1210.

Then, an image area corresponding to the first backlight block among the plurality of backlight blocks in the second resolution image may be divided into a plurality of image areas in operation S1220.

Then, current information corresponding to the first backlight block and a second backlight block adjacent to the first backlight block may be acquired based on the plurality of image areas in operation S1230.

Afterwards, the backlight unit may be driven based on the acquired current information in operation S1240. Here, the display panel is a liquid crystal panel, and the plurality of backlight blocks may be driven by a local dimming method or a global dimming method.

Here, the horizontal resolution of the second resolution image may be identical to the horizontal resolution of the first resolution image, and the vertical resolution of the second resolution image may correspond to an N equal division value of the vertical resolution of the first resolution image. In this case, in the operation S1220, the image area corresponding to the first backlight block in the second resolution image may be divided into N image areas, and in the operation S1230, current information corresponding to the first backlight block and N−1 backlight blocks adjacent to the first backlight block in a vertical direction may be acquired based on the divided N image areas.

Also, the controlling method may further include the operations of determining a frame rate of the second resolution image based on the first resolution and the second resolution, and adjusting an output interval of a current dimming value for driving the backlight unit based on the frame rate of the second resolution image. Here, the frame rate of the second resolution image may be N times of a frame rate corresponding to the first resolution image.

In addition, the display apparatus may further include a panel driver driving the display panel and a backlight driver driving the backlight unit. In this case, in the operation of determining the frame rate of the second resolution image, a vertical synchronization signal may be output to the panel driver based on the frame rate of the second resolution image. Also, in the operation of adjusting the output interval of the current dimming value, a dimming control value for adjusting the output interval of the current dimming value based on the frame rate of the second resolution image may be output to the backlight driver.

Further, the display panel may include a plurality of pixel lines, and in the controlling method, the same data may be provided to at least two adjacent pixel lines among the plurality of pixel lines, and the display panel may be controlled to output the second resolution image at the determined frame rate. Here, the number of the plurality of pixel lines may correspond to the number of pixels provided in a vertical direction among a plurality of pixels included in the display panel.

Also, the controlling method may further include the operations of, based on the display apparatus operating in a first display mode, controlling the display panel to output the first resolution image at a first frame rate, and driving the backlight unit based on current information acquired based on the first resolution image and the first frame rate. In addition, the controlling method may further include the operations of, based on the display apparatus operating in a second display mode, controlling the display panel to output the second resolution image at a second frame rate greater than the first frame rate, and driving the backlight unit based on current information acquired based on the second resolution image and the second frame rate.

Further, the controlling method may further include the operation of operating the display apparatus in any one of the first display mode or the second display mode based on a user input or a type of an image.

According to the aforementioned one or more embodiments, in the case of outputting an image of which resolution is reduced at a high speed frame rate, the brightness of the backlight can be prevented from being distorted. Also, backlight dimming can be controlled to be appropriate for each of a plurality of display modes. Accordingly, an image with improved image quality can be provided to a user.

At least some components of the methods according to the aforementioned one or more embodiments of the disclosure can be implemented in forms of applications that can be installed on at least one of a conventional display apparatus or a display apparatus providing an image to a conventional display apparatus.

Also, at least some components of the methods according to the aforementioned one or more embodiments of the disclosure can be implemented just with software upgrade, or hardware upgrade for at least one of a conventional display apparatus or a conventional display apparatus.

In addition, at least some components of the aforementioned one or more embodiments of the disclosure can also be performed through an embedded server provided in a display apparatus or at least one of display apparatuses, or through an external server of a display apparatus or at least one of display apparatuses.

At least some components of the aforementioned one or more embodiments can be implemented in a recording medium that can be read by a computer or an apparatus similar to a computer, by using software, hardware, or a combination thereof. In some cases, at least some components of the embodiments described in this specification may be implemented as the processor 130 itself. According to implementation by software, at least some components of the embodiments such as processes and functions described in this specification may be implemented as separate software modules. Each of the software modules can perform one or more functions and operations described in this specification.

Computer instructions for performing processing operations of the display apparatus 100 according to the aforementioned one or more embodiments of the disclosure may be stored in a non-transitory computer-readable medium. Computer instructions stored in such a non-transitory computer-readable medium make the processing operations at the display apparatus 100 according to the aforementioned one or more embodiments performed by a specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disk, a blue-ray disk, a USB, a memory card, a ROM, and the like.

Further, while embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A display apparatus comprising:
a display panel;
a backlight unit comprising a plurality of backlight blocks; and
a processor configured to drive the backlight unit to output light,
wherein the processor is further configured to:
adjust a first image having a first resolution to a second image having a second resolution that is smaller than the first resolution,
divide an image area corresponding to a first backlight block among the plurality of backlight blocks in the second image having the second resolution into a plurality of image areas,
acquire current information corresponding to the first backlight block and a second backlight block adjacent to the first backlight block, based on the plurality of image areas, and
drive the backlight unit based on the acquired current information.

2. The display apparatus of claim 1, wherein a horizontal resolution of the second image having the second resolution is the same as a horizontal resolution of the first image having the first resolution, and
wherein a vertical resolution of the second image having the second resolution corresponds to an N equal division value of a vertical resolution of the first image having the first resolution, wherein N is a natural number that is equal to or greater than one, and
wherein the processor is further configured to:
divide the image area corresponding to the first backlight block in the second image having the second resolution into N image areas, wherein N is a natural number that is greater than one,
based on the divided N image areas, acquire current information corresponding to the first backlight block and N−1 backlight blocks adjacent to the first backlight block in a vertical direction, and
drive the backlight unit based on the acquired current information.

3. The display apparatus of claim 1, wherein the processor is further configured to:
acquire a current dimming value for driving the backlight unit based on the current information,
determine a frame rate of the second image with the second resolution based on the first resolution and the second resolution, and
adjust an output interval of the current dimming value based on the frame rate of the second image with the second resolution.

4. The display apparatus of claim 3, wherein a horizontal resolution of the second resolution is the same as a horizontal resolution of the first resolution,
wherein a vertical resolution of the second resolution corresponds to an N equal division value of a vertical resolution of the first resolution, wherein N is a natural number that is equal to or greater than one, and
wherein the frame rate of the second image having the second resolution is N times of a frame rate corresponding to the first image having the first resolution.

5. The display apparatus of claim 3, further comprising:
a panel driver configured to drive the display panel; and
a backlight driver configured to drive the backlight unit,
wherein the processor is further configured to:
output a vertical synchronization signal to the panel driver based on the frame rate of the second image having the second resolution, and
output a dimming control value for adjusting the output interval of the current dimming value based on the frame rate of the second image having the second resolution to the backlight driver.

6. The display apparatus of claim 3, further comprising a plurality of pixel lines,
wherein the processor is further configured to:
provide a same data to at least two adjacent pixel lines among the plurality of pixel lines, and
control the display panel to output the second image having the second resolution at the determined frame rate.

7. The display apparatus of claim 6, wherein a number of the plurality of pixel lines corresponds to a number of pixels provided in a vertical direction among a plurality of pixels in the display panel.

8. The display apparatus of claim 1, wherein the processor is further configured to:
based on the display apparatus operating in a first display mode, control the display panel to output the first image having the first resolution at a first frame rate, and drive the backlight unit based on current information acquired based on the first frame rate and the first image having the first resolution, and
based on the display apparatus operating in a second display mode, control the display panel to output the second image having the second resolution at a second frame rate that is greater than the first frame rate, and drive the backlight unit based on current information acquired based on the second frame rate and the second image with the second resolution.

9. The display apparatus of claim 8, wherein the processor is further configured to operate the display apparatus in one of the first display mode or the second display mode based on a user input or a type of an image.

10. The display apparatus of claim 1, wherein the display panel is a liquid crystal panel, and
wherein the processor is further configured to drive the plurality of backlight blocks by a local dimming method or a global dimming method.

11. A method performed by a display apparatus comprising a display panel and a backlight unit comprising a plurality of backlight blocks, the method comprising:
adjusting a first image having a first resolution to a second image having a second resolution that is smaller than the first resolution;
dividing an image area corresponding to a first backlight block among the plurality of backlight blocks in the second image having the second resolution into a plurality of image areas;
acquiring current information corresponding to the first backlight block and a second backlight block adjacent to the first backlight block, based on the plurality of image areas; and
driving the backlight unit based on the acquired current information.

12. The method of claim 11, wherein a horizontal resolution of the second image having the second resolution is the same as a horizontal resolution of the first image having the first resolution,
wherein a vertical resolution of the second image having the second resolution corresponds to an N equal division value of a vertical resolution of the first image having the first resolution, wherein N is a natural number that is equal to or greater than one, and
wherein the dividing the image area comprises dividing the image area corresponding to the first backlight block in the second image having the second resolution into N image areas, and
wherein the acquiring the current information comprises, based on the divided N image areas, acquiring current information corresponding to the first backlight block and N−1 backlight blocks adjacent to the first backlight block in a vertical direction.

13. The method of claim 11, further comprising:
determining a frame rate of the second image having the second resolution based on the first resolution and the second resolution; and
adjusting an output interval of a current dimming value for driving the backlight unit based on the frame rate of the second image having the second resolution.

14. The method of claim 13, wherein a horizontal resolution of the second resolution is the same as a horizontal resolution of the first resolution,
wherein a vertical resolution of the second resolution corresponds to an N equal division value of a vertical resolution of the first resolution, wherein N is a natural number that is equal to or greater than one, and
wherein the frame rate of the second image having the second resolution is N times of a frame rate corresponding to the first image having the first resolution.

15. The method of claim 13, wherein the determining the frame rate of the second image having the second resolution comprises outputting a vertical synchronization signal to a panel driver configured to drive the display panel based on the frame rate of the second image having the second resolution, and
wherein the adjusting the output interval of the current dimming value comprises outputting a dimming control value for adjusting the output interval of the current dimming value based on the frame rate of the second image having the second resolution to a backlight driver configured to drive the backlight unit.

16. The method of claim 13, wherein the display panel comprises a plurality of pixel lines, and
wherein the method further comprising:
providing a same data to at least two adjacent pixel lines among the plurality of pixel lines, and
controlling the display panel to output the second image having the second resolution at the determined frame rate.

17. The method of claim 16, wherein a number of the plurality of pixel lines corresponds to a number of pixels provided in a vertical direction among a plurality of pixels in the display panel.

18. The method of claim 11, wherein the method further comprising:
based on the display apparatus operating in a first display mode, controlling the display panel to output the first image having the first resolution at a first frame rate, and driving the backlight unit based on current information acquired based on the first frame rate and the first image having the first resolution, and
based on the display apparatus operating in a second display mode, controlling the display panel to output the second image having the second resolution at a second frame rate that is greater than the first frame rate, and driving the backlight unit based on current information acquired based on the second frame rate and the second image with the second resolution.

19. The method of claim 18, the method further comprising:
operating the display apparatus in one of the first display mode or the second display mode based on a user input or a type of an image.

20. A non-transitory computer readable recording medium storing computer instructions that cause a display apparatus to perform an operation when executed by a processor of the electronic apparatus, the display apparatus comprising a display panel and a backlight unit comprising a plurality of backlight blocks, wherein the operation comprises;
adjusting a first image having a first resolution to a second image having a second resolution that is smaller than the first resolution;
dividing an image area corresponding to a first backlight block among the plurality of backlight blocks in the second image having the second resolution into a plurality of image areas;
acquiring current information corresponding to the first backlight block and a second backlight block adjacent to the first backlight block, based on the plurality of image areas; and
driving the backlight unit based on the acquired current information.

* * * * *